United States Patent [19]
Kent et al.

[11] Patent Number: 4,795,590
[45] Date of Patent: Jan. 3, 1989

[54] TREATMENT OF HAZARDOUS MATERIAL WITH VAPOR SUPPRESSING, PERSISTENT, WATER-CONTAINING, POLYMERIC AIR FOAM

[75] Inventors: Dale W. Kent, Maplewood; Thomas W. Berger, Roseville, both of Minn.

[73] Assignee: Minnesota Mining and Manufacturing Company, St. Paul, Minn.

[21] Appl. No.: 855,461

[22] Filed: Apr. 24, 1986

Related U.S. Application Data

[63] Continuation-in-part of Ser. No. 737,938, May 28, 1985, abandoned.

[51] Int. Cl.$^4$ .................... C08G 18/08; C08G 18/30
[52] U.S. Cl. .................... 252/307; 252/315.01; 252/315.3; 521/159; 521/906
[58] Field of Search ............ 252/3, 8.05, 307, 315.01, 252/315.3; 521/159, 906

[56] References Cited

U.S. PATENT DOCUMENTS

| | | | |
|---|---|---|---|
| 3,330,782 | 7/1967 | Poppelsdorf | 260/2.5 |
| 3,562,156 | 2/1971 | Francen | 252/8.05 |
| 3,719,050 | 3/1973 | Asao et al. | 61/36 R |
| 3,772,195 | 11/1973 | Francen | 252/8.05 |
| 3,805,531 | 4/1974 | Kistner | 61/36 R |
| 3,805,532 | 4/1974 | Kistner | 61/36 R |
| 3,894,131 | 7/1975 | Speech | 264/45.2 |
| 3,985,688 | 10/1976 | Speech | 260/2.5 |
| 4,118,354 | 10/1978 | Harada et al. | 260/29.2 |
| 4,149,599 | 4/1979 | Chiesa, Jr. | 169/47 |
| 4,237,182 | 12/1980 | Fulmer et al. | 428/310 |
| 4,303,534 | 12/1981 | Hisamoto et al. | 252/3 |
| 4,315,703 | 2/1982 | Gasper | 405/264 |
| 4,359,096 | 11/1982 | Berger | 169/44 |
| 4,379,763 | 4/1983 | Clemens et al. | 252/628 |
| 4,476,276 | 10/1984 | Gasper | 524/500 |

FOREIGN PATENT DOCUMENTS 0073863 3/1983 European Pat. Off. .......... 143/14

OTHER PUBLICATIONS

National Geographic Magazine, Mar. 1985, pp. 318–351.
"In the Dumps", The Wall Street Journal, May 16, 1985, pp. 1, 16.
Consulting Engineer, Mar. 1984, pp. 35–47.
3M Bulletin Y-FGB3(83.5)II Issued Apr. 1, 1978.
3M Bulletin Y-FATCB(311)BE Issued Feb. 1981.
Ansul Company Bulletin F-81105 (1981).
Angus Fire Armour Corporation Bulletin PAM 4/84–5M.
National Foam System, Inc. Bulletin 68040 (1980).
Encyclopedia of Chemical Technology, Kirk-Othmer, 3rd Ed., vol. 23, pp. 576–579, John Wiley & Sons (1983).
Journal of American Chemical Society, 49, pp. 3181–3188 (1927).
Encyclopedia of Chemical Technology, Kirk-Othmer, 2nd Ed., vol. 12, pp. 46, 47, Interscience Pub. (1967).
"Foams", J. J. Bikerman, Springer-Verlag, New York, Inc., pp. 108–132 (1973).
Encyclopedia of Chemical Technology, Kirk-Othmer, 3rd Ed., vol. 22, pp. 347–387, John Wiley & Sons (1983).
NFPA-11-1983 Standard of the National Fire Protection Association, Inc.; "Low Expansion Foam & Combined Agent Systems".
Bulletin PDB #1 of Kelco Company Primary Examiner—John F. Terapane
Assistant Examiner—Susan Wolffe
Attorney, Agent, or Firm—Donald M. Sell; William G. Ewert

[57] ABSTRACT

Air is mechanically entrained in an aqueous solution of surfactant and poly(oxyalkylene) polyisocyanate polymer, the poly(oxyalkylene) portion of which contains sufficient oxyethylene units to render the polymer water-soluble and hydrophilic, to form a fluid, water-based, air foam which is sprayed or otherwise applied to exposed surface of a substrate, such as a body of hazardous material, the applied foam gelling or increasing in viscosity, due to reaction of the polyisocyanate polymer with water to form a poly(oxyalkylene) polyurea polymer, and forming a persistent gelled air foam or viscous air foam in the form of a coating on the exposed surface, thus sealing or otherwise protecting or controlling the substrate.

50 Claims, No Drawings

TREATMENT OF HAZARDOUS MATERIAL WITH VAPOR SUPPRESSING, PERSISTENT, WATER-CONTAINING, POLYMERIC AIR FOAM

This application is a continuation-in-part of copending application Ser. No. 737,938, filed May 28, 1985, now abandoned.

This invention relates to the treatment of hazardous materials and other substrates such as those in hazardous waste sites and spilled or escaping from storage or transportation facilities. In another aspect, it relates to foams such as water-based foams and their use in such treatment. In another aspect, it relates to aqueous foam-forming liquids and film-forming foams made therefrom and used in the control of vapors or extinguishing of fires of flammable liquids. In another aspect, it relates to hydrophilic poly(oxyalkylene) isocyanate-terminated prepolymers and foams made therefrom and used to consolidate or seal substrates.

During recent years, the threat of hazardous wastes, hazardous spills, leaks, and accidents of flammable liquids, and other hazardous materials to public health and safety and to the environment has received increasing attention and raised national concerns and issues which are being addressed by a host of local ordinances and state and federal laws and regulations. Some of the hazardous waste sites have been called "deadly" and "screaming emergencies". See *National Geographic Magazine*, March 1985, pages 318–351 and "In the Dumps", *The Wall Street Journal*, May 16, 1985, pages 1, 16. Various technologies have been used or proposed for the treatment or control of such materials. See, for example, *Consulting Engineer*, March, 1984, pages 35–47.

There are thousands of hazardous waste sites in the United States, such as impoundments, burial dump sites, and landfills in which wastes from industrial and commercial operations, research and retail establishments, educational and hospital laboratories, and military complexes have been stored or disposed. Such sites are either still operating, inactive, or abandoned and the emission or release of gases, vapors, odors, liquids, and dust from such sites and their pollution of the air and surface or ground water and contamination of soil are uncontrolled or are controlled or managed by various techniques many of which have disadvantages which limit their applicability.

An example of a particularly serious hazardous waste dump is the McColl Dump in Orange County, Calif., an abandoned World War II dump containing acid petroleum sludges, oil field drilling muds, waste hydrocarbons, sulfur dioxide, and benzene, which dump is in close proximity to a residential area of more than 800 homes. A cleanup solution proposed for that site is excavation of the hazardous waste material by workers in protective clothing and hauling by trucks of the excavated material elsewhere, with the possible evacuation of people from the neighborhood if emissions of gases and odors cannot be controlled. Two remedial actions were proposed in October, 1983, for emission control of the dump by the application to the site and hauled excavated material of a foam. One foam is formed from water-diluted, aerated, fluid, aqueous film-forming concentrate or foaming agent sold as LIGHT WATER Brand AFFF/ATC FC-600. Repeated or frequent applications of such foam may be necessary, however, because the life of such foam is relatively short or transient or not persistent due to its drainage and consequent collapse or degradation, the foam being thus characterized as "temporary". The other foam, "Sani-Blanket", is composed of an aminoplast resin, apparently made from urea and formaldehyde, the foam having mixed open and closed cells.

Aqueous film-forming solutions, such as said LIGHT WATER product and other foaming agent products used in fire-fighting, are for control of vapors of flammable liquids and fires thereof. They are concentrates containing surfactants, and upon dilution with water and mechanical aeration with foam-generating equipment, such as an air-aspirating nozzle, they produce a fluid, water-based, aerated foam (or air foam) which is applied to the flammable or burning liquid to form a foam blanket from which drains an aqueous fluid film that floats on the liquid and reduces its vaporization and excludes oxygen from its surface. Commercial bulletins describing LIGHT WATER Brand AFFF and AFFF/ATC products are the 3M Company bulletins Y-FGB3(83.5)II, issued April 1, 1978, and Y-FATCB(311)BE, issued February, 1981. ("AFFF" and "ATC" are industry abbreviations for aqueous film-forming foam and for alcohol type concentrate, respectively). Other commercial bulletins on foaming agent products used for fire-fighting are bulletin F-81105 (1981) of the Ansul Company describing ANSULITE ARC, bulletin PAM 4/84-5M of Angus Fire Armour Corp. describing "ALCOSEAL" FFFP, and bulletin 68040 (1980) of National Foam System, Inc., describing AER-O-FOAM and AER-O-WATER concentrates. Patents describing fire-fighting agents of the AFFF type and similar products include U.S. Pat. Nos. 3,562,156 (Francen), 3,772,195 (Francen), 4,149,599 (Chiesa), and 4,303,534 (Hisamoto et al).

U.S. Pat. No. 4,237,182 (Fulmer et al) relates to a method of sealing a surface, such as that of a mine, with a fire-retarding polyurethane foam by spraying with an airless spray gun or additional air blast a mixture of a hydrophilic polyoxyalkylene urethane prepolymer and a large amount of an aqueous slurry containing a phosphorus compound, alumina trihydrate, and a char-forming material or carbon compound such as starch or wood cellulose, and optionally, the use of a surfactant, other than an anionic surfactant, as a suspending agent or thickener for the alumina trihydrate or to influence cell size or structure.

Other references—though they relate to the use of various poly(oxyalkylene) isocyanate-terminated prepolymers to form other than aerated foam products, namely carbon dioxide-generated foams (in some cases using surfactants to stabilize cell structure) useful in sealing structures, such as sewer lines, consolidating aggregates, such as soil, or treating contaminated waste water—are U.S. Pat. Nos. 3,805,531 (Kistner), 3,805,532 (Kistner), 3,719,050 (Asao et al), 3,894,131 (Speech), 4,118,354 (Harada et al), 4,379,763 (Clemens et al), and 4,476,276 (Gasper).

Briefly, in one aspect of this invention, a fluid, water-based, aerated or air-entrained, closed cell, low density foam (or air foam) is sprayed or otherwise applied as a wet, three-dimensional coating, blanket, or layer to exposed surface of a substrate, such as a body of hazardous material, for example a hazardous waste dump or a pool of a spilled, volatile, flammable liquid, the applied foam gelling, or increasing in viscosity without gelling, and thus stabilizing in situ and forming a wet, persistent or long-lasting, sealing or vapor suppressing, closed cell, hydrogel air foam, or a viscous water-containing air foam, in the form of a coating, blanket, or layer on the substrate. Such a coating results in minimizing, suppressing, controlling, reducing or preventing the emission, spreading, or release of gases, vapors, odors, dusts, or liquids that may be present in the hazardous material or substrate and physically immobilizing, constraining, consolidating, sealing, or inactivating the exposed surface so coated. (The term "air foam" is used in its industry-accepted sense to mean a foam made by physically mixing air into a liquid, and thus the term is distinct from chemical or carbon dioxide foam or halocarbon blown foam.)

The foam as prepared and applied is initially a fluid, two phase-system (an agglomeration of air bubbles) of a discontinuous or dispersed gas phase, viz., air, and a continuous, aqueous, polymer liquid phase, viz., bubble walls or lamellae, comprising water in which is dissolved or dispersed small amounts of organic material, namely surfactant foaming agent and water-reactive, hydrophilic poly(oxyalkylene) polyisocyanate polymer gelling or viscosity-increasing agent, the poly(oxyalkylene) portion of which contains sufficient oxyethylene units, $-CH_2CH_2O-$, to render the polymer water-soluble and hydrophilic. The water of the liquid phase can also contain optional components, such as rubber or polymeric latex particles. The liquid phase of the foam is the major or predominant phase by weight. Upon or following application of the fluid foam to the hazardous material or substrate, the isocyanate groups of the water-reactive polymer react in situ with a stoichiometric amount of the water in the foam to form a chain-extended or crosslinked, hydrophilic, polyurea polymer and carbon dioxide gas (essentially or practically all of which gas apparently dissolves in the unreacted or bulk water and thus does not significantly foam the water). As a consequence of the polymerization of the water-reactive polymer, the three-dimensional, closed cell structure of applied foam is thus stabilized in the form of either a non-fluid, gelled air foam or a viscous air foam. The gelled air foam is a two-phase system of discontinuous gas (air) phase and a continuous, soft, semi-solid hydrogel phase comprising bound water and water-insoluble polyurea polymer. The viscous air foam is a two-phase system of discontinuous gas (air) phase and continuous aqueous polymer phase comprising water and polyurea polymer. The polyurea polymer in both the gelled and viscous foams comprises a plurality of said poly(oxyalkylene) chains, the oxyethylene content being sufficient to render the polymer hydrophilic. The hydrogel or viscous phase is the major or predominant phase by weight. The lamellae or liquid film of the air bubbles in the applied fluid foam is gelled, or becomes viscous, thus minimizing, reducing, or preventing the drainage of liquid from the lamellae and the consequent rupture of the bubbles and collapse of the foam structure. Due to the hydrophilic nature of the polyurea polymer, water in the foam is retained or bound and it, together with the closed cell nature of the resulting gelled or viscous foam, provides a stable, persistent or long-lasting, sealing or vapor suppressing blanket or barrier on the exposed, treated surface of the hazardous material or substrate. Such a foam blanket excludes oxygen or air from the treated hazardous material, or lowers the vaporization rate of liquid in the hazardous material or substrate so treated, and greatly facilitates clean-up procedures such as excavation and hauling of excavated material by reducing the risk of ignition of flammable vapors, reducing the concentration of toxic vapors in the work area, and reducing the environmental impact of the hazardous material.

The fluid foam can be conveniently formed by mechanically or physically entraining or dispersing air in a fresh or just-prepared, low viscosity, aqueous solution of the surfactant and reactive poly(oxyalkylene) polyisocyanate polymer, for example by pumping the solution to air-aspirating foam producing equipment and applying, for example by spraying, the resulting fluid, low density foam onto the hazardous material or substrate. The solution can be prepared at the time of application by bringing together two liquid streams from separate sources, one stream comprising water and surfactant and the other stream in the form of a concentrate comprising the water-reactive polymer dissolved in an anhydrous, water-soluble or -dispersible, non-reactive organic solvent, or one stream comprising water and the other stream in the form of an anhydrous concentrate comprising surfactant and the water-reactive polymer in said solvent. Since the water and polyisocyanate polymer components will react when they come together, they should be kept separate until or just before the fluid foam is prepared and applied. The surfactant and water-reactive polymer can be combined as a concentrate in water-soluble or -dispersible organic solvent which is not reactive with isocyanate.

Advantages of the treatment, control, or management of hazardous materials or substrates in accordance with this invention, as compared to technologies proposed or used heretofore for such treatment, include: the use of an inexpensive and readily available raw material, namely water, either fresh or as sea water, which forms the bulk of the weight of the foam, and generally is the only inorganic material in the foam system of this invention; the use of other materials, namely, the surfactant foaming agent and water-reactive polymer agent, which are used in relatively small amounts and many types of which agents are commercially available; a treatment which can use equipment that is not particularly energy intensive or expensive and is conventional or easily modified, conventional equipment, namely, pumps, valves, regulators, mixers, tanks, hoses, and foam-generating nozzles, etc., the operation of which can be carried out without specialized labor; the fact that the gelled or viscous foam does not significantly increase the weight and volume of the hazardous material or substrate to which it is applied, that is, there is a high substrate-to-foam weight or volume ratio; and the facts that the gelled or viscous foam is conformable and adheres to many types of substrates, is relatively innocuous, noncorrosive, nonflammable, relatively stable and persistent or long-lasting, inherently white or light-colored and can be dyed (thus the extent of application is visually perceptible), does not require high application temperatures or drying, and rapidly covers, traps, immobilizes, restrains, or consolidates the hazardous material or substrate, and is quickly effective as a control measure.

The relative amounts of the various components of the foams of this invention can vary widely. Functionally expressed, the amount of surfactant foaming agent to be used will be that sufficient to cause the aqueous foamable solution of it and the gelling or viscosity-increasing agent, upon aeration, to form a foam having sufficient expansion value such that said foam has a density less than 1 g/cc, which expansion value generally will be greater than about 1.5, and preferably will be 2 to 20 (a range which can be characterized as "low expansion") and can be as high as 200 or even 1000. Such a foam will thus float on water and is less dense than most other liquids, e.g. flammable liquids, and thus is generally buoyant. Generally, the surfactant will be about 0.05 to 2 weight percent, preferably about 0.2 to 0.5 weight percent, of the foamable aqueous solution. The amount of gelling or viscosity-increasing agent in the aqueous foamable solution will be that sufficient to gel or merely increase the viscosity of the fluid foam, whichever is desired, at a desired time upon or after application of the fluid foam to the hazardous material or substrate, which time can be from less than 1 minute to 20 minutes or longer after the foamable solution is formed, depending, for example, on the functionality of the water-reactive agent and its reactivity with water, the presence of catalysts for the water-isocyanate reaction, the desired extent or nature of the application, e.g. how large an area is to be covered with the fluid foam before it gels or reaches its desired increase in viscosity, whether the substrate is horizontal, vertical, or inclined, the particular hazard to be controlled, etc. Generally, the amount of the gelling or viscosity-increasing agent (excluding its solvent) will be a small amount, about 2 to 15 weight percent, preferably about 3 to 10 weight percent, of the foamable aqueous solution; thus, the solids content of the foams of this invention which is attributable to the gelling or viscosity-increasing agent will be low. When the gelling or viscosity-increasing agent is used in the form of a concentrate solution in an organic solvent, e.g., acetone, such solutions will have a concentration generally about 20 to 90 weight percent of the agent, depending upon the molecular weight and chemical nature of the agent. Generally, the amount of such solvent in the foamable aqueous solution and foam thereof will be less than about 30 weight percent, preferably less than about 10 weight percent. The amount of water to be used in forming the foam will be far in excess of that required to react with all the isocyanate moieties of the gelling or viscosity-increasing agent, and will be that sufficient to provide sufficiently low viscosity to the foamable aqueous solution to enable its efficient handling and to enable the fluid foam to flow and cover the desired substrate area and form a foam of sufficient expansion and quality; in any case, however, the amount of water to be used will be such that it is the major component, by weight, i.e. greater than 50 weight percent and generally about 53 to 98 weight percent, preferably 75 to 97 weight percent, of the aqueous foamable solution (as well as of the fluid foam and gelled or viscous foam produced therefrom). The amount of air to be entrained in the aqueous foamable solution will be that sufficient to obtain sufficient expansion; in any case, however, the amount of air to be entrained generally will be such that the fluid air foam and the gelled or viscous air foam will have the aforementioned expansion value, and preferably the entrained air will be the major component of the foam thereof by volume, i.e., greater than 50 volume percent, and even as high as 98 volume percent, and more preferably in the range of 75 to 90 volume percent.

Poly(oxyalkylene)polyisocyanates useful as gelling agents or viscosity increasing agents in this invention are known—see, for example, Encyclopedia of Chemical Technology, Kirk-Othmer 3rd Ed., Vol. 23, p. 576–579, John Wiley & Sons (1983). A particularly useful class of such agents can be prepared by reacting a stoichiometric excess of polyisocyanate with a poly-ether polyol polymer having at least two hydroxyl groups and a chain containing a plurality of sufficient oxyethylene units to render the chain hydrophilic and impart water solubility to the polymer and the resulting product, the NCO/OH equivalent ratio being at least 2:1 and preferably slightly higher, e.g., 2.1:1 to 2.5:1. As a result of the reaction, the polyol and polyisocyanate residues are linked by carbamate or urethane linkages, —OC(O)NH—. Products of this type are often used in the preparation of polyurethane polymers and thus are often referred to as isocyanate-terminated prepolymers or isocyanate-terminated urethane prepolymers. Upon reaction of such prepolymers with water, carbon dioxide is formed and the residues of the prepolymer molecules are linked essentially by urylene linkages, —NH-C(O)NH—, in a polymerization or crosslinking reaction that forms poly(urethane-urea)polymer that is hydrophilic (if sufficient oxyethylene units are in the prepolymer) and thus water-swellable. When such polymerization occurs in the practice of this invention, where the major component in the foam system, by weight, is water, the product is either in the form of a gelled, closed cell air foam containing bound water, i.e., a hydrogel air foam, or in the form of a viscous, closed cell air foam containing bulk water, which foam in either case is stable, persistent or long-lasting, and relatively impermeable to vapor or gas. The gelled foam is also flexible, elastic, and resilient.

Water-soluble, water-reactive, hydrophilic isocyanate-terminated prepolymers useful in this invention as gelling or viscosity-increasing agents can be expressed in terms of the formula:

$$Y_1[(RO)_o-Y_2(NCO)_p]_z \qquad \text{I}$$

In formula I, $Y_1$ is an active hydrogen-free residue of a low molecular weight, initiator organic compound having a plurality of active hydrogen atoms (e.g. 2 or 3), such as a polyhydroxyalkane, polyaminoalkane, or polyether polyol, e.g., ethylene glycol, ethylene diamine, glycerol, or 1,1,1-trimethylolpropane. $(RO)_o$ is a hydrophilic poly(oxyalkylene) chain having a plurality of oxyethylene units and, optionally, higher oxyalkylene units, e.g, units with 3 or 4 carbon atoms, such as (1) a poly(oxyethylene) chain, (2) a chain having alternating blocks or backbone segments of oxyethylene units and oxypropylene units, or (3) a chain of randomly distributed (i.e., a heteric mixture) of oxyethylene and oxypropylene units. The subscript o is the number of oxyalkylene units in said poly(oxyalkylene) chain. The number of oxyethylene units in the prepolymer is sufficient to render it hydrophilic and water-soluble; generally, the oxyethylene content of the prepolymer for this purpose will be at least 30 weight percent, preferably greater than about 50 or even about 70 to 75 weight percent, of the prepolymer. $Y_2$ is an organic linkage or bridge, the function of which is to bond said poly(oxyalkylene) chain to the isocyanate moieties shown in the formula, the subscript p being 1 to 5. Where the prepolymer is prepared by reacting a poly(oxyalkylene) polyol and a polyisocyanate, the poly(oxyalkylene) chain of the prepolymer will be principally terminated on one end with the group —OC(O)NH—R'(NCO)$_p$, R' being the organic residue of the polyisocyanate. The moiety —C(O)NH—together with the adjacent oxygen atom of the poly(oxyalkylene) chain is a carbamate (or urethane) group, —OC(O)NH—, resulting from the reaction of a hydroxy group of the poly(oxyalkylene)

polyol reactant with an isocyanate moiety from the polyisocyanate reactant. The subscript z is a number equal to the functionality or number of said active-hydrogen atoms in said initiator compound (e.g. said polyhydroxyalkane) and generally z will be 2 to 6, preferably 2 or 3. The terminating isocyanate groups can react with water and any water-soluble, isocyanate-reactive chain extender or crosslinker that may also be present, resulting in the formation of polyurea polymer having a plurality of said hydrophilic poly(oxyalkylene) chains. Suitable chain extenders which can be included in the foamable aqueous solution are conventional compounds for the reaction including ethylenediamine, 1,2-propylenediamine, trimethylenediamine, tetramethylenediamine, hexamethylenediamine and hydrazine. Suitable conventional crosslinkers include diethylenetriamine and triethylenetetramine.

The term "active hydrogen atom" as used herein refers to a hydrogen atom which reacts with the isocyanate moiety under urethane or urea bond-forming conditions, (determined by the Zerewitinoff procedure, Journal of American Chemical Society, 49, p. 3181 (1927) such as that disclosed in U.S. Pat. No. 3,330,782).

Preferred water-soluble prepolymers within the scope of this invention are those of the formula:

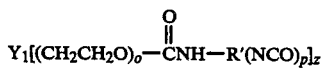

where $Y_1$, p and z are as defined above for Formula I, p preferably being 1 to 3, z preferably being 2 or 3, R' is the organic residue of a polyisocyanate, and o is a number of oxyethylene units necessary to make the prepolymer soluble in water.

A species of prepolymer within the scope of formula II is $OCNC_6H_3(CH_3)NHCO(OCH_2CH_2)_nOCONHC_6H_3(CH_3)NCO$ where n is sufficiently high to render the prepolymer hydrophilic and water-soluble.

Another preferred subclass of water-soluble prepolymers useful in this invention can be expressed by the formula:

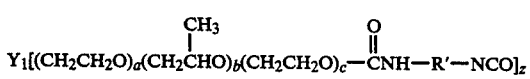

where $Y_1$, R', and z are as defined in Formula II, z preferably being 2 or 3, and a, b and c are integers such that the ratio of (a+c)/b is greater than 1, e.g. up to 4 or greater, and thus the prepolymers are water-soluble.

Another preferred subclass of water-soluble prepolymers useful in this invention can be expressed by the formula:

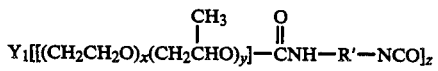

where $Y_1$, R', and z are as defined in Formula II, x and y are integers such that the ratio x/y is greater than 1, e.g. up to 3 or greater, and thus the prepolymers are water-soluble, the $CH_2CH_2O$ and $CH_2CH(CH_3)O$ units being randomly distributed within the brackets enclosing the same.

The isocyanate-terminated prepolymers used in this invention can be tailored in structure to obtain controlled water solubility in order to attain practical reaction times and achieve desired physical properties in the gelled or viscous foam.

If the isocyanate functionality of the prepolymer is about 2, the resulting polyurea formed therefrom will be mainly linear and non-crosslinked, unless crosslinkers are included in the foamable solution, such as diethylene triamine, triethylenetetramine, etc. If the isocyanate functionality is greater than 2, e.g., 3, a crosslinked polyurea will result.

In the event that the prepolymer's reaction with the water is slower or faster then desired, the reaction time can be shortened or extended by addition of an appropriate agent to the foamable solution. For example, the reaction time can be extended by adding alkylsulfate surfactants or a water-soluble, reactive, monofunctional alcohol or amine, e.g. methylamine, to decrease functionality, or shortened by adding minor amounts of a catalyst such as a tertiary amine, e.g. triethylamine, or a metal catalyst, e.g. dibutyltin dilaurate as disclosed in said U.S. Pat. No. 3,985,688, or the gelation or thickening process can be accelerated by adding a water-soluble, reactive polyamine, e.g. diethylenetriamine.

The preparation of isocyanate-terminated prepolymers, such as those used in this invention, and the reaction thereof with water to form a polyurea, is disclosed in the art, e.g., said U.S. Pat. Nos. 3,805,531, 3,805,532, 3,719,050, 3,894,131, 4,315,703, and 4,476,276, a prepolymer product particularly useful in this invention being "Prepolymer A" (a solution of prepolymer in acetone) described in the latter patent.

To insure sufficient hydrophilicity of the polyurea in the foams of this invention, the polyether polyol used to prepare the prepolymer will generally have a number average molecular weight range of about 1,000 to 20,000, preferably 3,000 to 10,000. Commercially available polyol precursors useful for that purpose are those sold, for example, under the trademark CARBOWAX, e.g., CARBOWAX 3350 (formerly called 4000), having about 76 oxyethylene units in a chain like that shown in Formula II, and PLURONIC, such as PLURONIC F-77, having the poly(oxyalkylene) chain shown in Formula III where a+c is about 108 and b is about 35.

Polyisocyanates which can be used to prepare the isocyanate-terminated prepolymer used in this invention and described above include conventional aliphatic and aromatic polyisocyanates. The preferred polyisocyanates are aromatic polyisocyanates because the prepolymers made therefrom will generally react faster with water. One of the most useful polyisocyanate compounds which can be used for this purpose is tolylene diisocyanate, either tolylene-2,4-isocyanate or tolylene-2,6-isocyanate, or a blend of the 2,4- and 2,6-isomers. These polyisocyanates are commercially available under the trademark HYLENE TM, NACCONATE 90, and MONDUR RD-80. Other polyisocyanate compounds which can be used are other isomers of tolylene diisocyanate, hexamethylene-1,6-diisocyanate, methylenebis(4-cyclohexylisocyanate), 1,3,3-trimethyl-5-isocyanatocyclohexyl-1-methylisocyanate, p-xylylenediisocyanate, diphenylmethane-4,4'-diisocyanate, m- or p-phenylene diisocyanate and 1,5-naphthalene diisocyanate. Polymeric polyisocyanates can also be used, such as polymethylene polyphenyl polyisocyanates, e.g., those sold under the trademarks MONDUR MRS and PAPI. A list of useful commercially available polyisocyanates is found in Encyclopedia of Chemical Technology by Kirk and Othmer, 2nd Ed., Vol. 12, pages 46, 47, Interscience Pub. (1967). The organic residues, R' supra, provided by the polyisocyanate can be alkylene groups, such as ethylene, isobutylene, hexylene, and methylenedicyclohexylene, having 2 to about 20 carbon atoms, aralkylene groups, such as —CH$_2$C$_6$H$_4$CH$_2$— and —C$_6$H$_4$CH$_2$C$_6$H$_4$—, having up to 20 carbon atoms, arylene groups, such as —C$_6$H$_4$—, aliphatic polyethers, such as —(C$_2$H$_4$O)$_y$C$_2$H$_4$—, where y is 1 to about 5, and combinations thereof. Such groups can also include other hetero moieties (besides —O—), including —S— and

However, R' is preferably free of groups with active hydrogen atoms.

The polyurethane prepolymers used in this invention are generally liquids or greasy, waxy or pasty solids at room temperature.

If needed, the polyurethane prepolymer may be dissolved in a suitable water-soluble or water-dispersible, non-reactive (free of active hydrogen atoms) organic solvent to facilitate handling, the resulting solution having a lower viscosity which makes it more readily pumpable. If the amount of solvent for that purpose would disadvantageously affect the foamability of prepolymer-surfactant aqueous fluid, a readily foamable, readily pumpable fluid can be made with a lesser amount of such solvent by additionally incorporating in the prepolymer-solvent solution a lower molecular weight, polyurethane prepolymer, which may even be water-insoluble per se (but soluble in the prepolymer-solvent solution). An example of such lower molecular weight, water insoluble, polyurethane prepolymer can be made, for example, by reacting a 1000 MW polyether polyol, e.g. UCON 75H-450, having an oxyethylene/oxypropylene mole ratio of 3/1, with a slight excess of tolylene-2,4-diisocyanate. The solvent chosen preferably should be such that the resulting solution will be liquid at the ambient conditions of storage or use. Useful solvents include acetone, ethyl acetate, methyl ethyl ketone, dibutyl phthalate, benzyl butyl phthalate, tetrahydrofuran, dimethylformamide, diethylene glycol monoethyl ether acetate (sold under the trade designation CARBITOL acetate), propylene glycol monomethyl ether acetate (sold under the trade designation ARCOSOLV PM acetate), gamma-butyrolactone, N-methyl-2-pyrrolidone, and diethyl acetal.

The surfactants, or surface active agents, useful as foaming agents in the practice of this invention are synthetic or natural organic compounds or materials capable of foaming water, which are compatible with the reactive poly(oxyalkylene) prepolymer. Those surfactants which are preferred are those sometimes characterized as capable of forming "strongly foaming solutions", e.g., see "Foams", J. J. Bikerman, published by Springer-Verlag, New York, Inc., pages 108-132 (1973). The usefulness of a surfactant, and its amount, for purposes of this invention, can be determined by the foam volume or height and its resistance to collapse. Generally, the applicable surfactant and amount thereof useful in producing the foams of this invention will yield a foam volume (or height) at least one-and-a-half, and preferable at least twice, that of the foamable aqueous solution, a simple test for this purpose being the shaking by hand of the solution in a suitable closed container. For example, 100 g of such solution is vigorously shaken 25 times in a 480 cc, or larger, closed glass jar or a calibrated vessel, and the height of the resulting foam vis-a-vis the height of the solution before shaking is measured, the ratio of foam height to solution height being the expansion value.

The surfactants useful in this invention can be nonionic, cationic, anionic, or amphoteric, and compatible mixtures thereof. Classes of surfactants which are useful include: soaps or the salts of fatty acids, such as those having the general formula RCOOM, where R is a fatty aliphatic group and M is an alkali metal, e.g., sodium oleate, laurate, palmitate, or stearate; fatty alkyl sulfates, such as those of the general formula ROSO$_2$OM, e.g., sodium octyl, decyl, dodecyl, tetradecyl, hexadecyl, heptadecyl, or octadecyl sulfate; salts of alkarylsulfonic acids, such as those of the general formula RC$_6$H$_4$SO$_3$M, e.g., sodium octylbenzene sulfonate; ethylene oxide adducts, such as those of the general formula R(CH$_2$CH$_2$O)$_n$H where R is a fatty aliphatic radical, e.g., where R is C$_{10}$H$_{21}$O to C$_{16}$H$_{33}$O and n is 10 to 60; those of the general formula R(OCH$_2$CH$_2$-)$_n$OSO$_3$M, where R is a C$_{10}$ to C$_{18}$ alkyl, n is 1 to 3, and M is sodium; and salts of dialkyl sulfosuccinic acids, e.g., sodium dioctyl sulfosuccinate. Also see Encyclopedia of Chemical Technology, Kirk-Othmer, 3rd Ed., Vol. 22, pages 347-387, John Wiley & Sons (1983) for other surfactants useful in this invention. Many of these hydrocarbon surfactants are biodegradable, making the foams made therefrom particularly advantageous where their biodegradability is desired, e.g. in treating municipal waste sites and sanitary landfills.

Another class of surfactants useful as foaming agents in this invention are fluoroaliphatic surfactants which can be used alone or particularly in combination with fluorine-free surfactants (sometimes called "hydrocarbon surfactants") where the foam is to be used to control the vapor emission of flammable liquid by formation of an aqueous surfactant film on the surface thereof, such film forming before the fluid foam has completely gelled or reached high viscosity. In such combinations of surfactants, the ratio of fluorine-free surfactant to fluoroaliphatic surfactant generally will be 1:25 to 10:1, usually 1:15 to 5:1.

Fluoroaliphatic surfactants which can be used are those which contain one or more fluorinated aliphatic radicals (R$_f$) and one or more water-solubilizing polar groups (Z), which radicals and groups are usually connected together by suitable linking groups (Q).

Fluoroaliphatic surfactants useful and incorporated herein by reference are those disclosed in U.S. Pat. Nos. 3,562,156 (Francen), 3,772,195 (Francen), and 4,359,096 (Berger), and European Patent Application 0 073 863 A1. The particular structure of the fluoroaliphatic surfactant is not critical; rather, it is the balance of the physical properties of the compound that determines its usefulness for the purpose of this invention. It may be desirable where the fluoroaliphatic and hydrocarbon surfactants are combined for the said control of vapor emission of flammable liquid that the combination of fluoroaliphatic radical and water-solubilizing group in the fluoroaliphatic surfactant be so balanced as to provide the fluoroaliphatic surfactant with a solubility in water at 25° C. of at least 0.01 percent by weight. It is preferred that the solubility in water be at least about 0.25 percent by weight. The fluoroaliphatic surfactant to be used in said combination with hydrocarbon surfactant generally will be sufficiently surface active to provide a surface tension of less than about 28 dynes/cm, preferably less than 23 dynes/cm, in aqueous solution at a concentration of about 0.25% or less.

The fluoroaliphatic surfactant will contain at least about 20 percent by weight of fluorine, i.e., carbon-bonded fluorine, in the surfactant. The fluorinated aliphatic radical, $R_f$, in the fluoroaliphatic surfactant used in this invention can be generally described as a fluorinated, saturated, monovalent, non-aromatic radical of at least 3 carbon atoms. The aliphatic chain may be straight, branched, or, if sufficiently large, cyclic and may include oxygen or trivalent nitrogen atoms bonded only to carbon atoms. A fully fluorinated radical is preferred, but hydrogen or chlorine atoms may be present as substituents provided that not more than one atom of either is present for every two carbon atoms, and preferably, the radical contains at least a terminal perfluoromethyl group. While radicals containing a larger number of carbon atoms will function adequately, compounds containing not more than about 20 carbon atoms are preferred since larger radicals usually represent a less efficient utilization of fluorine than is possible with shorter chains. Fluoroaliphatic radicals containing about 5 to 12 carbon atoms are most preferred.

The water-solubilizing polar group, Z, of the fluoroaliphatic surfactant can be an anionic, cationic, non-ionic or amphoteric moiety or combinations thereof. Typical anionic groups include $CO_2H$, $CO_2M$, $SO_3H$, $SO_3M$, $OSO_3H$, $OSO_3M$, $OPO(OH)_2$, and $OPO(OM)_2$, where M is a metallic ion, such as sodium, potassium, calcium, etc. Typical cationic groups include $NH_2$, NHR, where R is a lower alkyl group such as methyl, ethyl or butyl, $NR'_3A'$, where R' is a lower alkyl group or hydrogen and A' is an anion such as chloride, sulphate, phosphate, hydroxyl, etc. Typical non-ionic groups would include $NR_2 \rightarrow O$ and those derived from polyethylene oxide and mixed polyethylene oxide-polypropylene oxide polyols. Typical mixed or amphoteric groups would include $N^+(CH_3)_2C_2H_4COO^-$.

The linking group, Q, is a multivalent, generally divalent, linking group such as alkylene, arylene, sulfonamidoalkylene, carbonamidoalkylene, and the like. In some instances more than one fluoroaliphatic radical may be attached to a single linking group and in other instances a single fluoroaliphatic radical may be linked by a single linking group to more than one polar solubilizing group.

A particularly useful class of fluoroaliphatic surfactants which can be used in this invention are those of the formula $(R_f)_n(Q)_mZ$, where $R_f$ is said fluoroaliphatic radical, n is 1 or 2, Q is said linking group, m is an integer of 0 to 2, and Z is said water-solubilizing group.

Representative fluoroaliphatic surfactants useful in this invention include:

$C_8F_{17}SO_3K$
$C_6F_{13}SO_2N(CH_2CHOHCH_2SO_3^-)C_3H_6N^+(CH_3)_2C_2H_4OH$
$C_8F_{17}SO_2NHCH_2C_6H_4SO_3Na$
$C_8F_{17}SO_2NHC_6H_4SO_3Na$
$C_6F_{13}SO_2N(C_3H_6SO_3^-)C_3H_6N^+(CH_3)_2C_2H_4OH$
$C_7F_{15}CONHC_3H_6N^+(CH_3)_2C_2H_4COO^-$
$C_8F_{17}C_2H_4SC_2H_4CONHC(CH_3)_2CH_2SO_3Na$
$C_8F_{17}SO_2N(C_2H_5)C_2H_4OP(O)(OH)_2$
$C_6F_{13}SO_2NHC_3H_6N^+(CH_3)_3Cl^-$
$C_8F_{17}SO_2NHC_3H_6N^{3\oplus}(CH_3)_3 {}^-O_3SOCH_3$
$(CF_3)_2CF(CF_2)_6COOH.H_2NC_2H_5$
$C_7F_{15}COOH.H_2NC_3H_6N^+(CH_3)_2C_2H_4COO^-$
$C_7F_{15}CONHC_3H_6N(CH_3)_2 \rightarrow O$
$C_8F_{17}SO_2N(C_2H_5)CH_2CO_2K$
$C_6F_{13}C_2H_4SO_2N(CH_3)C_2H_4N^+(CH_3)_2C_2H_4COO^-$
$C_6F_{13}SO_2N(CH_2CHOHCH_2SO_3Na)C_3H_6N(CH_3)_2$
$C_8F_{17}C_2H_4SCH(CH_2COONa)COONa$
$C_8F_{17}C_2H_4SC_2H_4CONHC_2H_4N^+(CH_3)_3Cl^-$
$C_{10}F_{20}HOC_6H_4SO_3Na$
$(CF_3)_2CF(CF_2)_4CONHC_2H_4SO_3Na$
$[C_6F_{13}SO_2NHC_3H_6N^+(CH_3)_2C_2H_4OH]OH^-$
$[C_6F_{13}SO_2N(CH_2CH_2OH)C_3H_6N^+(CH_3)_2C_2H_4OH]OH^-$
$C_6F_{13}SO_2N(CH_2CH_2OH)C_3H_6N(CH_3)_2$
$C_6F_{13}SO_2NHC_3H_6N^+(CH_3)_2CH_2CH_2COO^-$
$C_6F_{13}SO_2N(CH_2COOH)C_3H_6N(CH_3)_2$
$C_7F_{15}COOH.H_2NCH_2COOH$
$C_8F_{17}C_2H_4SC_2H_4CONH_2$
$C_6F_{13}SO_2NHC_3H_6N(CH_3)_2 \rightarrow O$
$C_8F_{17}SO_2NHC_3H_6N(CH_3)C_3H_6SO_3Na$
$C_8F_{17}SO_2NHC_3H_6N(C_2H_4OH)C_3H_6SO_3Na$
$C_7F_{15}CONHC_3H_6N(CH_3)C_3H_6SO_3Na$
$C_6F_{13}SO_2N(C_2H_5)C_3H_6NHCH_2CH(OH)CH_2SO_3Na$ and compatible mixtures thereof.

The water-soluble, fluorine-free surfactants used in combination with the fluoroaliphatic surfactants to make a foam having film-forming capability like AFFF fire-fighting agents are those organic compounds which are water-soluble, e.g., to at least about 0.02 percent by weight in water at 25° C., and are capable of promoting the film-forming ability of a normally non-film-forming, aqueous fluorocarbon surfactant solution. Such surfactants substantially completely emulsify at least one phase of a mixture of equal volumes of cyclohexane and water at a concentration of about 0.1 to 10 weight percent of the water. Additionally, the fluorine-free surfactants used in the combination must be compatible with the fluoroaliphatic surfactants. Compatibility here means that the two types of surfactants do not interact to produce an inactive product. The fluorine-free surfactants particularly useful alone or in said combination with the fluoroaliphatic surfactants include those described in the aforementioned patents and they can be selected on the basis of the tests described in U.S. Pat. No. 3,772,195 (Francen).

Representative fluorine-free surfactants useful in the practice of this invention alone or in combination with the fluoroaliphatic surfactants include:

$C_8H_{17}OSO_3Na$
$C_{10}H_{21}OSO_3Na$
$C_{12}H_{25}OSO_3Na$
$C_{10}H_{21}SO_3K$

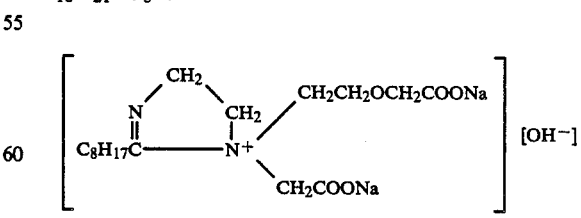

$C_{12}H_{25}N(CH_2CH_2COONa)_2$
$C_8H_{17}C_6H_4O(C_2H_4O)_{30}H$
$C_{12}H_{25}N^+(CH_3)_2C_2H_4SO_3^-$
$C_8H_{17}O_2CCH_2CH(CO_2C_8H_{17})SO_3Na$
$C_{12}H_{25}N^+(CH_3)_3Cl^-$
$(C_8H_{17}O)_2P(O)ONa$

HO(C₂H₄O)$_a$(C₃H₆O)$_b$(C₂H₄O)$_c$H, MW 6500, where a+b is about 108 and c is about 35

$C_{12}H_{25}O(C_2H_4O)_4C_2H_4OSO_3^-NH_4^+$ $C_8H_{17}SC_2H_4CONHC(CH_3)_2CH_2SO_3Na$ $C_{12}H_{25}SO_2N(CH_2COO^-)C_3H_6N^+(CH_3)_3$ $C_{12}H_{25}N(CH_3)_2{\rightarrow}O$ and compatible mixtures thereof. Certain fluorine-free silicone surfactants are known to be useful in forming AFFF solutions or as foaming agents per se and they can be used.

One particularly useful foam system of this invention is that obtained by mixing the isocyanate-terminated poly(oxyalkylene) prepolymer with the foaming agents sold as concentrates under the trademark LIGHT WATER such as the AFFF type or AFFF/ATC type, which products are described in said 3M bulletins and said U.S. Pat. Nos. 3,562,156 and 3,772,195. Those foam systems can be applied with the same equipment used in applying those commercial products and for the same purpose.

In general, the weight ratio of fluorine-free surfactant to fluoroaliphatic surfactant in the combinations of the AFFF type is in the range of 1:25 to 10:1.

Optional components of the foam systems of this invention include: polymeric stabilizers and thickeners such as polysaccharides, partially hydrolyzed protein, starches, polyvinyl resins, e.g. polyvinyl alcohol and polyacrylamides, carboxyvinyl polymers, and poly(oxyethylene) glycol; foam stabilizers such as ethylene glycol, diethylene glycol, glycerol, ethyl CELLOSOLVE, and butyl CARBITOL; foam tougheners and shrink control agents, such as aqueous rubber or polymeric latices, e.g. styrene-butadiene rubber latices, poly(chloroprene)rubber latices, poly(chloroprene-co-methacrylic acid) rubber latices, and the polymer latices described in said U.S. Pat. No. 4,315,703; and other additives or components such as electrolytes, corrosion inhibitors, and biocides. Such optional components should be compatible with the other components in the foam systems and are used in amounts which do not disadvantageously affect the desired properties, such as foamability, and function, such as the sealing capability, of the foam system. The total amount of solids attributable to said optional components will be such that the aqueous solution is still foamable and the density of the foam prepared therefrom is less than 1 g/cc. Generally, the amount of solids attributable to said optional components will be less than about 40 weight percent, preferably less than about 30 weight percent, of the foamable aqueous solution.

The aqueous fluid foams of this invention can be generated by the following procedure. Solutions of the hydrophilic isocyanato-terminated poly(oxyalkylene) prepolymers in water-soluble organic solvents, e.g., acetone or methyl ethyl ketone, or in water-soluble or dispersible organic solvents, e.g., dibutyl phthalate, or as solutions in a blend of solvents, are mixed with an aqueous surfactant solution in the desired ratio, e.g., with a proportioning apparatus. The resulting aqueous, foamable solution is sprayed under pressure through a foam-generating nozzle, preferably an air-aspirating nozzle, to generate the fluid aqueous foam. Gelation time of the aqueous foam, or the time at which it reaches its desired increase in viscosity, can be controlled by the proper selection and concentration of the reactive prepolymer, chain extending agents, crosslinking agents, urea-forming catalyst, and the aqueous foaming agent.

A particularly useful proportioning, foam-generating and foam application apparatus (used in Examples 64, 65, 66) comprises a pressure vessel containing separate tanks for the reactive polymer agent and a solvent for flushing out lines after use, a pressure vessel for the aqueous surfactant solution, a gear pump driven by a variable speed motor to supply via a check valve the reactive polymer agent and flush solvent from their tanks to a helical static mixer, a photoelectric tachometer to sense the speed of the gear pump and regulate the flow of such materials, lines fitted with air pressure regulators and valves for supplying compressed air to the pressure vessels to force the contents therefrom via dip tubes and lines to the check valve, flexible hose connecting the check valve, static mixer, and an air-aspirating nozzle (such as that described in said 3M bulletin Y-FATCB(311)BE) for application of the foam, and other associated pipe lines or hoses, etc., connecting the pieces of equipment as described.

Descriptions of various foam system equipment that can be used for handling and applying the foam system of this invention are described in above-cited 3M bulletins and in the NFPA-11-1983 Standard of the National Fire Protection Association, Inc. for "Low Expansion Foam and Combined Agent Systems".

The hazardous materials which can be treated or controlled with the foam in accordance with this invention include the various materials present in hazardous waste sites described at the beginning of this specification, such as land burial dumps, impoundments, and lagoons. Such materials can be organic or inorganic liquids, semi-liquids, or solids, such as synthetic or natural organic chemicals, heavy or toxic metals, solvents, effluents, household garbage and trash, discarded products, spent raw materials, contaminated containers, sludges, mill tailings, burn residues, contaminated soil, flammable and volatile liquids, etc., disposed in such sites from industrial and commercial operations, etc. Such wastes can be toxic, noxious, ignitable, flammable, combustible, corrosive, or dangerously reactive. The body of such materials can be treated in situ with the foam or as excavated or removed from such sites. Spills or leaks of hazardous liquids from pipelines or containers such as tanks or vehicles can also be treated.

The foams of this invention are particularly useful during or in connection with the excavation of material from hazardous waste sites (e.g. "Superfund sites"), a type of clean-up operation which many believe is the best solution to the problems posed by such sites.

Materials which are not wastes, spills, or the like but rather have utility and are innately harmful or have toxicity, and thus are potentially hazardous, can also be treated with the foam, for example coal in transport by train cars or barges or the coal in mine tunnels, to seal the exposed surfaces from air and minimize or prevent fires or to control such fires. Thus, the term "hazardous" in its broader sense is used in this application to include present or imminent hazards due to existing exposure as well as potential hazards due to the innate harmful or toxic effects of a material which becomes hazardous upon exposure.

The foams can also be used in suppression of noise or shock waves emanating, for example, from machinery. Plastic bags, e.g., polyethylene bags, filled with the foam can also be used for shock absorption, e.g. as rescue pads in the escape from burning buildings.

Other applications for foam of this invention include use as a thermal insulating blanket or barrier, e.g., for Class A combustible material such as residential or commercial building structures, e.g., walls and roofs, and use as a fire break in brush or forest fires.

Another use as an insulating blanket for the foam of this invention is as an aid in controlling the curing or setting of cementitious materials, such as concrete, mortar, or cement slurries, especially in cold, subfreezing weather, where the foam acts as a thermal blanket for accelerating the curing of the slurry by retaining the heat of the curing reaction, or where it is desired to retain moisture during curing or preventing rain water from affecting curing.

Generally, the materials or substrates than can be treated with the foams of this invention will be those that are not reactive, undesirably reactive, or adversely affected by the foams.

The amount or thickness of foam applied to the hazardous material or substrate or the extent of its application can vary depending on such factors as the nature, magnitude, location, and permanency of the hazardous material or substrates, the presence of environmental factors such as wind, rain, drainage, etc., and the particular threat to health, safety, and environment that the material poses. The thickness of the foam applied to the material thus can vary, for example from 1 cm to 30 cm or higher, e.g. up to 1 meter or more. In any event, the thickness of the foam will generally be sufficient to alleviate or prevent the threat posed by the material or to achieve the desired function of the foam, e.g. as an insulating blanket, shock wave absorber, and noise suppressor. Where the material evolves or releases volatile or superficial products such as gases, fumes, vapors, dust, etc., or it is desired to seal a material from ambient air to control or prevent combustion or oxidation of the material, the amount or thickness of the foam will be such as to suppress the volatilization or escape of the material to the atmosphere or suppress its contact with atmosphere, the relative vapor impermeability of the foam due to its large amount of water and closed cell structure significantly contributing to such suppression.

In the case of flammable liquids such as hydrocarbons and polar solvents and combustible liquids, such as gasoline, diesel fuel and other fuels, or chemicals which are volatile or noxious, such as naphthalene, the foam of this invention can be applied in the same manner as the conventional aqueous film-forming solutions applied as a water-base foam for fire suppression or vapor control—see the aforementioned commercial bulletins and NFPA Standard 11-1983. Like such conventional products, where the surfactant used in generating the foams of this invention is the aforementioned combination of fluoroaliphatic and hydrocarbon surfactants, such foams can be used to control or combat fires of flammable materials, such as aircraft fuel fires, petrochemical storage facility fires, oil tanker fires, and coal car fires, and various industrial fires of spilled fuel and solvent. Like conventional AFFF products, the applied foam of this invention will spread over and float on the surface of the flammable or burning liquid. A durable, rapidly forming, and spreading vapor-sealing film of aqueous surfactant drains from the foam before it gels or becomes viscous, aiding it in suppressing the volatilization of the liquid and extinguishing such fires, such film and foam also securing non-ignited areas and preventing ignition or re-ignition. Because of the stability and long life of the gelled or viscous foam of this invention, the reapplication of it will generally not be necessary or often required (particularly if the foam is gelled), unlike conventional AFFF products which produce foams having a much shorter life, due to drainage and collapse, and have greater mobility or susceptibility to dislodgement due to wind, evaporation, and the thermal convection caused by fires.

Objects and advantages of this invention are illustrated in the following examples. In these examples the "Ignition Test" was a test for flammable vapors carried out by passing by hand a burning wooden match immediately above a test beaker containing the foam-treated volatile flammable liquid and noting whether any vapor ignited, no ignition indicating that the foam was suppressing the vapors of the flammable liquid. If no ignition occurred with gelled foam, the burning match was usually placed on the surface of the gelled foam and any ignition noted. The water referred to in these examples was tap water unless otherwise noted. Where comparison examples were carried out, they are sometimes designated by the letter "C" and followed by a number, e.g., C1, C2 etc.

EXAMPLE 1

This example describes the preparation of a poly(oxyethylene) diisocyanate prepolymer and its use as a gelling agent together with sodium decyl sulfate as a foaming agent in the preparation of a foam of this invention.

In a 240 cc dry glass jar containing a magnetic stirring bar was placed 40 g (0.12 mole) CARBOWAX 3350 polyethylene glycol and as a solvent therefor 40 g ARCOSOLV PM propylene glycol methyl ether acetate. The mixture was warmed to 35°-40° C. and stirred to dissolve the polyethylene glycol. To the resulting stirred solution was added (at 35° C.) 4.35 g (0.25 mole) of tolylene-2,4-diisocyanate and the reaction mixture was heated to 50°-55° C. and stirred at this temperature for 3 hours to yield poly(oxyethylene) diisocyanate prepolymer, mainly $OCNC_6H_3(CH_3)NH\text{-}CO(OCH_2CH_2)_nOCONHC_6H_3(CH_3)NCO$, where n has an average number of about 76, as a solution in the acetate solvent. The solution (hereinafter referred to as Prepolymer A) solidified at room temperature, but could be made fluid again by warming to about 40° C.

In a 480 cc glass jar were placed 11.5 g Prepolymer A and 88.5 g of a 0.5 wt.% aqueous solution of sodium decyl sulfate, and the contents of the jar was vigorously shaken by hand for 1 minute to entrain air. The resulting fluid foam had an expansion value of about 3 and was white in color. Twenty g of the fluid foam was immediately poured onto 200 ml isopropyl ether in a 250 cc polyethylene beaker, the fluid foam floating on the ether. The foam gelled at about 30 seconds after so pouring it, or about 90 seconds after the initial mixing of the Prepolymer A and aqueous surfactant solution. (The balance of foam left in the shaken jar likewise gelled at the same time.) The beaker (and contents) was weighed immediately and again after standing at room temperature (ca 22° C.) for 90 minutes, and the difference in weights (i.e., weight loss) was found to be 1.0 g. The appearance of the foam, including its white color, the size of its bubbles (less than about 1 mm), and its volume at the time of the 90 minute weighing appeared the same as when the foam initially gelled. An ignition test, carried out immediately after the 90 minute weighing, resulted in no ignition. In a comparison example, C1, a foam was prepared as described above, except that no Prepolymer A was used and 100 g of the surfactant solution was shaken, the expansion value of the resulting foam (which did not gel and collapsed in less than 5 minutes after it was poured on the isopropyl ether) being about 5. The weight loss was 8.2 g and the ignition test resulted in immediate ignition.

Observation of the gelled foam, left in the glass jar, about 24 hours after preparation, showed that no liquid had drained from the foam and its appearance was unchanged. A piece of the gelled foam, about 1.5 cm in diameter and about 4 cm in length, was stretched by hand to a little more than twice its length without breaking and upon being released it returned to its original length, showing it to have elastomeric properties. The piece was also folded upon itself without breaking, showing it to have flexibility. It was depressed by finger pressure to less than ⅓ of its thickness and upon release of the pressure it returned immediately to its original thickness, showing it to be resilient. The gelled foam was tacky to the touch and removably adhered to the glass jar in which the foam was prepared.

EXAMPLES 2-13

These examples illustrate the use of commercially available surfactants as foaming agents and a poly(oxyethylene-co-oxypropylene) polyisocyanate prepolymer as a gelling agent in preparing gelled foams of this invention and the utility of the foams in suppressing the vapors of a flammable liquid.

The prepolymer used was prepared as follows. Benzoyl chloride (0.58 g)—as an inhibitor of side reactions—was blended at room temperature under an inert atmosphere with 1738 g (1 equivalent) of an approximately 5000 M.W. Polyether triol (a copolymer of ethylene oxide and propylene oxide having a random or atactic distribution and sold under the trade designation DOW XD 1421). Thereafter, 191.4 g (2.2 equivalents) of an 80:20 mixture of tolylene-2,4-diisocyanate:tolylene-2,6-diisocyanate was rapidly added to the resultant mixture with aggressive agitation, producing a moderate exotherm which was maintained at 80°-85° C. until the reaction was completed. The progress of the reaction was followed by titrating samples of the mixture until the reaction was complete, whereupon the reaction mixture was allowed to cool to room temperature. The upper portion of the reaction mixture was decanted to leave a 100% solids prepolymer product which was dissolved in sufficient reagent grade acetone to provide a 80% solids prepolymer solution hereinafter designated "Prepolymer B".

In each said example of the invention, a foamable, gelable aqueous solution of surfactant and gelling agent was vigorously shaken by hand in a closed 480 cc glass jar; 20 g of the resulting fluid foam was poured into a 250 cc polyethylene plastic beaker containing 200 ml isopropyl ether, and the foam floated thereon. The beaker (and its contents) was weighed immediately after the pouring and after standing 1 hour at room temperature (ca 22° C.), the difference in weights was determined (as "weight loss"), and an ignition test conducted immediately after the last weighing. Comparison examples were also run following the same procedure but omitting the gelling agent. In each said example of the invention, the fluid foam quickly gelled after being poured into the beaker (i.e., within 2 to 4 min.), the expansion value of the foam being about 3, and in the comparison examples (where no gelling agent was used) the fluid foam did not gel and its expansion value was about 5. The examples and results are summarized in Table I.

TABLE I

| | Examples | | | | | | | | | | | |
|---|---|---|---|---|---|---|---|---|---|---|---|---|
| | C2 | 2 | C3 | 3 | C4 | 4 | C5 | 5 | C6 | 6 | C7 | 7 |
| Foam composition: | | | | | | | | | | | | |
| Gelling agent, g Prepolymer B | | 5 | | 5 | | 5 | | 5 | | 5 | | 5 |
| Aqueous surfactant solution, g | | | | | | | | | | | | |
| DOW CORNING 193[a] | 95 | 95 | | | | | | | | | | |
| TRITON X-100[b] | | | 95 | 95 | | | | | | | | |
| DERIPHAT 160C[c] | | | | | 95 | 95 | | | | | | |
| ARQUAD 12-33[d] | | | | | | | 95 | 95 | | | | |
| SIPONATE DS-10[e] | | | | | | | | | 95 | 95 | | |
| MAYPON 4C[f] | | | | | | | | | | | 95 | 95 |
| AMIDOX C-5[g] | | | | | | | | | | | | |
| HAMPOSYL L-95[h] | | | | | | | | | | | | |
| ALIPAL CD-128[i] | | | | | | | | | | | | |
| PRELL[j] | | | | | | | | | | | | |
| Sodium decyl sulfate | | | | | | | | | | | | |
| $C_6F_{13}SO_2NHC_3H_6N^+(CH_3)_2CH_2CH_2COO^-$ | | | | | | | | | | | | |
| Weight loss, g | 7.4 | 1.1 | 6.6 | 3.2 | 5.6 | 3.6 | 7.3 | 2.0 | 9.8 | 3.3 | 6.5 | 0.6 |
| Ignition test results | Y | N | Y | N[k] | Y | N[k] | Y | N | Y | N[k] | Y | N |

| | Examples | | | | | | | | | | |
|---|---|---|---|---|---|---|---|---|---|---|---|
| | C8 | 8 | C9 | 9 | C10 | 10 | C11 | 11 | 12[m] | C13 | 13 |
| Foam composition: | | | | | | | | | | | |
| Gelling agent, g Prepolymer B | | 5 | | 5 | | 5 | | 5 | 5 | | 5 |
| Aqueous surfactant solution, g | | | | | | | | | | | |
| DOW CORNING 193[a] | | | | | | | | | | | |
| TRITON X-100[b] | | | | | | | | | | | |
| DERIPHAT 160C[c] | | | | | | | | | | | |
| ARQUAD 12-33[d] | | | | | | | | | | | |
| SIPONATE DS-10[3] | | | | | | | | | | | |
| MAYPON 4C[f] | | | | | | | | | | | |
| AMIDOX C-5[g] | 95 | 95 | | | | | | | | | |
| HAMPOSYL L-95[h] | | | 95 | 95 | | | | | | | |
| ALIPAL CD-128[i] | | | | | 95 | 95 | | | | | |
| PRELL[j] | | | | | | | 95 | 95 | | | |
| Sodium decyl sulfate | | | | | | | | | 95 | | |
| $C_6F_{13}SO_2NHC_3H_6N^+(CH_3)_2CH_2CH_2COO^-$ | | | | | | | | | | 95 | 95 |
| Weight loss, g | 6.0 | 1.1 | 8.3 | 2.5 | 7.7 | 2.9 | 10 | 2.3 | — | 4.2 | 1.4 |

TABLE I-continued

| Ignition test results | Y | N | Y | N[k] | Y | N | Y | N | N | Y | N |
| --- | --- | --- | --- | --- | --- | --- | --- | --- | --- | --- | --- |

(Y = yes, ignition resulted N = no, ignition did not result)
[a] Silicone glycol copolymer
[b] Octylphenoxy polyethoxy ethanol
[c] Partial sodium salt of N—lauryl beta-iminodipropionate
[d] N—alkyl trimethyl ammonium chloride
[e] Sodium dodecyl benzene sulfonate
[f] Potassium salt of a collagen polypeptide coco fatty acid condensate
[g] Ethoxylated alkyloamide
[h] Sodium lauryl sarcosine
[i] Ammonium salt of ethoxylate sulfate
[j] The solution of this surfactant was 3.2 wt. %, and all other surfactant solutions were 1 wt. %
[k] Ignition around edge when burning match laid on gelled foam.
[m] A similar foamable aqueous solution, viz., containing 10 g Prepolymer B, 0.5 g sodium decyl sulfate, and 89.5 g synthetic sea water (ASTM D-1141-52), produced similar foam upon shaking and it likewise gelled.

The above examples and results show the wide variety of surfactants that can be used as foaming agents and that each gelled foam formed an effective vapor suppressing blanket, as indicated by the lower weight loss values and results of no ignition, as contrasted to the comparison examples.

EXAMPLES 14–25

These examples describe foams of this invention made with surfactant solutions sold as foam concentrates for fighting fires of flammable liquids and Prepolymer B as the gelling agent (which gelled the fluid foams in about 2 to 5 minutes after preparation of the foamable, gelable solutions.) The procedure used in preparing and evaluating the foams was that of Examples 2–13 except that various organic liquids in place of isopropyl ether were treated with the foams. In the comparison examples, no gelling agent was used, and the fluid foam did not gel. Additionally, the foam height was determined 1 hour after standing at room temperature. The examples and results are summarized in Table II.

In another comparison example, a non-aerated composition like that used in Example 14, but containing 5 g Prepolymer B and 95 g LIGHT WATER AFFF/ATC FC-600 6% aqueous surfactant solution, when stirred with a spatula to get a homogeneous solution, did not foam, though small bubbles were formed, presumably of carbon dioxide generated by the reaction of the prepolymer with water. Thus, the carbon dioxide gas does not significantly foam the composition, i.e. the foam expansion value was about 1. In two other comparison examples, non-aerated compositions containing, in one case, 10 g of a 70 wt% solution of Prepolymer B in ARCOSOLV PM acetate solvent and 90 g of said FC-600 6% aqueus surfactant solution, and, in the other case, 20 g of said solution of Prepolymer B and 80 g of said surfactant solution, when stirred with a spatula, had expansion values of only about 1.1 and 1.3, respectively.

TABLE II

| | EXAMPLES | | | | | | | | | | | |
| --- | --- | --- | --- | --- | --- | --- | --- | --- | --- | --- | --- | --- |
| | C14 | 14 | C15 | 15 | C16 | 16 | C17 | 17 | C18 | 18 | C19 | 19 |
| Foam composition, g: | | | | | | | | | | | | |
| Gelling agent Prepolymer B | | 5 | | 5 | | 5 | | 5 | | 5 | | 5 |
| Aqueous surfactant solution | | | | | | | | | | | | |
| LIGHT WATER AFFF/ATC FC-600[e] (6%) | 100 | 100 | 100 | 100 | 100 | 100 | 100 | 100 | 100 | 100 | | |
| LIGHT WATER AFFF FC-203C[f] (3%) | | | | | | | | | | | 100 | 100 |
| AER-O-FOAM XL-3 (3%) | | | | | | | | | | | | |
| ANSULITE ARC (6%) | | | | | | | | | | | | |
| AER-O-WATER (3%) | | | | | | | | | | | | |
| ALCOSEAL (6%) | | | | | | | | | | | | |
| Organic liquid treated: | | | | | | | | | | | | |
| Methanol | X | X | | | | | | | | | | |
| Acetone | | | X | X | | | | | | | | |
| Ethyl acetate | | | | | X | X | | | | | | |
| Acetic acid | | | | | | | X | X | | | | |
| Diethylamine | | | | | | | | | X | X | | |
| Cyclohexane | | | | | | | | | | | X | X |
| Ethyl ether | | | | | | | | | | | | |
| Methylene chloride | | | | | | | | | | | | |
| Hexane | | | | | | | | | | | | |
| Weight loss, g | 3.9 | 1.0 | 6.8 | 1.7 | 1.9 | 0.9 | 0.8 | 0.5 | 8.3 | 1.7 | 1.3 | 0.9 |
| Foam height, cm | 0.2 | 2.5 | 0.2 | 2.5 | 2 | 2.5 | 0.2 | 2.5 | 0.2 | 2.5 | 2 | 2.5 |
| Ignition test results | Y | N | Y | N | Y | N | N[a] | N[b] | Y | N | Y | N |

| | EXAMPLES | | | | | | | | | | | |
| --- | --- | --- | --- | --- | --- | --- | --- | --- | --- | --- | --- | --- |
| | C20 | 20 | C21 | 21 | C22 | 22 | C23 | 23 | C24 | 24 | 25 | |
| Foam composition, g: | | | | | | | | | | | | |
| Gelling agent Prepolymer B | | 5 | | 5 | | 10 | | 5 | | 5 | 6 | |
| Aqueous surfactant solution | | | | | | | | | | | | |
| LIGHT WATER AFFF/ATC FC-600[e] (6%) | | | | | | | | | | | | |
| LIGHT WATER AFFF FC-203C[f] (3%) | 100 | 100 | 100 | 100 | | | | | | | | |

TABLE II-continued

|  | | | | | | | | | | | |
|---|---|---|---|---|---|---|---|---|---|---|---|
| AER-O-FOAM XL-3 (3%) | | | | | 100 | 90 | | | | | |
| ANSULITE ARC (6%) | | | | | | | 95 | 95 | | | |
| AER-O-WATER (3%) | | | | | | | | | 95 | 95 | |
| ALCOSEAL (6%) | | | | | | | | | | | 94 |
| Organic liquid treated: | | | | | | | | | | | |
| Methanol | | | | | | | | | | | |
| Acetone | | | | | | | X | X | | | |
| Ethyl acetate | | | | | | | | | | | |
| Acetic acid | | | | | | | | | | | |
| Diethylamine | | | | | | | | | | | |
| Cyclohexane | | | | | | | | | | | |
| Ethyl ether | X | X | | | | | | | | | |
| Methylene chloride | | | X | X | | | | | | | |
| Hexane | | | | | X | X | | | X | X | X |
| Weight loss, g | 14 | 4.4 | 1.0 | 2.2 | 2.5 | 2.6 | 5.2 | 1.4 | 1.5 | 0.8 | — |
| Foam height, cm | 0 | 2.5 | 2 | 2.5 | 0.3 | 1 | 0 | 2.5 | 2.5 | 2.5 | — |
| Ignition test results | Y | N[c] | N | N[d] | Y | N | Y | N | Y | N | N |

[a]No ignition, but strong odor of acetic acid.
[b]No ignition or odor of acetic acid.
[c]Occasional small flashes above gelled foam.
[d]Non-flammable; no odor of methylene chloride.
[e]This product, a concentrate, comprises 62 wt % water, 12 wt % butyl CARBITOL, less than 5 wt % hydrocarbon surfactants, less than 5 wt % fluoroaliphatic surfactants, and less than 5 wt % hydrophilic polysaccharides.
[f]This product, also a concentrate, comprises 60 wt % water, 30 wt % butyl CARBITOL, less than 5 wt % fluoroaliphatic surfactants, and less than 5 wt % hydrocarbon surfactants, and less than 0.1 tolyltriazole.

EXAMPLES 26–34

These examples, summarized in TABLE III, show gelable foams of this invention can be made with various gel times, using in some cases an amount of certain surfactant in excess of that necessary to give a foamable composition.

TABLE III

|  | 26 | 27 | 28 | 29 | 30 | 31A | 31B | 32 | 33 | 34 |
|---|---|---|---|---|---|---|---|---|---|---|
| Foam composition | | | | | | | | | | |
| Gelling agent, g Prepolymer B | 6.5 | 6.5 | 6.5 | 6.5 | 6.5 | 5 | 5 | 5 | 5 | 5 |
| Foaming agent | | | | | | | | | | |
| LIGHT WATER AFFF FC-203A[b], g | 3 | 3 | 3 | 3 | 3 | 3 | 3 | 3 | 3 | 3 |
| Sodium lauryl sulfate (20%), g | 0 | 0.8 | 1.4 | 4.4 | 10 | 0 | 0 | 0 | 0 | 0 |
| Sodium decyl sulfate, g | 0 | 0 | 0 | 0 | 0 | 0 | 0.5 | 1 | 2 | 4 |
| Water, g | 97 | 96.2 | 95.6 | 92.6 | 90 | 95 | 94.5 | 94 | 93 | 91 |
| Gel time (min) | 1:10 | 5:00 | 7:25 | 10 | >14 | 1:07 | 2:48 | 5:30 | 18:30 | [a] |

[a]Did not gel within 48 hours. In a rerun of this example, adding an additional 1.5 g of Prepolymer B to the formulation resulted in gelation in 19 minutes.
[b]This product, a concentrate, is essentially the same as the FC-203C product except that it contains 65 wt % water and 25 wt % butyl CARBITOL.

EXAMPLES 35–40

These examples show viscous, slow draining, fluid foams or gelled foams of this invention can be made without gelling or with various gel times depending on the amount of reactive prepolymer in the foam system, such foams having slow drainage or no drainage. Where too low a concentration of prepolymer was used, gelation did not occur, but the drainage rates of the non-gelled, fluid foams were lowered due to an increase in viscosity of the foam. Results are shown in Table IV.

TABLE IV

| | EXAMPLES | | | | | | |
|---|---|---|---|---|---|---|---|
| | 35 | 36 | 37 | 38 | 39 | 40 | C40 |
| Foams Composition: | | | | | | | |
| Gelling agent, g Prepolymer B | 5.8 | 5.0 | 4.0 | 3.0 | 2.5 | 2.0 | 0 |
| Foaming aq. solution, g LIGHT WATER AFFF FC-203A (3%) | 100 | 100 | 100 | 100 | 100 | 100 | 100 |
| Gel time (min.) | 1:00 | 1:10 | 1:30 | [a] | [b] | [c] | — |
| 25% Drain time[d] | [e] | [e] | [e] | 12 hr | 7.5 min. | 5.2 min. | 5 min. |

[a]Viscous but pourable. The fluid viscosity of the solution used to make the foam of this example was 60 cps 2 min. after mixing, 500 cps 3 min. after mixing, and reached its maximum of about 1500 cps 5.5 min. after mixing. In another viscosity study, an aqueous solution of 0.5 wt % sodium decyl sulfate and 3.6 wt % Prepolymer B was found to have fluid viscosities of about 130 cps 9 min. after mixing, 300 cps 15 min. after mixing, 1550 cps 26 min. after mixing, and reached a maximum of 2100 cps 35 min. after mixing. Samples of the viscous solution were removed from the viscosity test beaker at 16, 26 and 40 min. after mixing, and each sample was found to be readily dispersible in water with mild agitation. This latter study shows that viscous foam of this invention can be disposed of by flushing with water the substrate covered with such foam. The viscosity measurements in these two viscosity studies were Brookfield viscosities run with a No. 3 spindle at 12 RPM.
[b]Fluid but some viscosity increase.
[c]Fluid without noticeable viscosity increase.
[d]NFPA Standard 11-1983, AFFF method (the time for 25% of the solution to drain from the foam).
[e]No drainage observed.

EXAMPLES 41–47

These examples illustrate how gelled foams of this invention can be modified to give a variety of gel times and gelled foam properties, e.g. water dispersibility, by incorporating amines or primary alcohols, incuding amino alcohols and amino acids, into the formulation as gel modifiers.

Foams were generated by placing each aqueous formulation in a 120 cc bottle and shaking vigorously by hand for 15 seconds. Compositions, foam gel times, and dispersibility properties are summarized in Table V. As shown, methanol and monofunctional amines (in Examples 42-45) retard the gel times of the foams compared to a foam (in Example 41) where no gel modifier was used, while polyfunctional amines (in Examples 46 and 47) accelerate the cure and produce a very firm gelled foam.

The gelled foams produced in Examples 42-45, using methanol or monofunctional amines in the formulation, were pourable and easily dispersed with a stream of tap water, yet all showed negligible liquid drainage after several days on the shelf. Such easily dispersible foam is useful in suppression of hazardous liquid spills, since the foam can be washed away with water several hours after use, e.g., with a stream of water from a fire hose.

TABLE V

| | EXAMPLES | | | | | | |
|---|---|---|---|---|---|---|---|
| | 41 | 42 | 43 | 44 | 45 | 46 | 47 |
| Foam Composition | | | | | | | |
| Gelling agent, 67 wt. % solution of acetone-free Prepolymer B in propylene glycol monomethyl ether acetate (ARCOSOLV PM acetate), g | 2.0 | 2.0 | 2.0 | 2.0 | 2.0 | 2.0 | 2.0 |
| Foaming agent, LIGHT WATER AFFF/ATC FC-600 (6% aqueous solution), g | 30 | 30 | 30 | 30 | 30 | 30 | 30 |
| Gel modifier, g | | | | | | | |
| Methanol | | 2.4 | | | | | |
| Methyl amine | | | 0.0053 | | | | |
| Diethanol amine | | | | 0.016 | | | |
| Glycine | | | | | 0.10 | | |
| Diethylenetriamine | | | | | | 0.019 | |
| JEFFAMINE D-230* | | | | | | | 0.06 |
| Foam Properties | | | | | | | |
| Foam gel time, min.** | 1:45 | 8:00 | 5:00 | 4:00 | 4:00 | 0:35 | 0:26 |
| Water-dispersibility of foam | poor | good | good | good | good | poor | poor |

*$H_2NCH(CH_3)CH_2[OCH_2CH(CH_3)]_{2.6}NH_2$
**Total time, including shaking of foam formulation.

TABLE VI

| | Example | | | |
|---|---|---|---|---|
| | C48 | 48 | C49 | 49 |
| Foam composition g | | | | |
| Gelling agent Prepolymer B | | 5 | | 5 |
| Foaming solution | | | | |
| LIGHT WATER AFFF/ATC FC-600$^a$ | 5.7 | 5.7 | | |
| $C_{10}H_{21}OSO_3Na$ | | | 0.29 | 0.29 |
| KELGIN XL sodium alginate polysaccharide (low MW)$^d$ | | | 0.19 | 0.19 |
| Water | 89.3 | 89.3 | 94.5 | 94.5 |
| Foam thickness on acetone (cm) | | | | |
| Initial | 2.5 | 2.5$^b$ | $c$ | 2.5$^b$ |
| After 15 min. | — | — | — | 2.5$^b$ |
| After 45 min. | 0.3 | 2.5$^b$ | — | — |
| Ignition test results | Yes | No | Yes | No |
| Sealing Test results Leakage | $e$ | No | $e$ | No |

$^a$Contains a high MW polysaccharide
$^b$Gelled foam
$^c$Foam destroyed on pouring onto the acetone in the beaker.
$^d$See bulletin PDB #1 of Kelco Company.
$^e$Test not run because there was no gelled foam layer to prevent leakage.

EXAMPLES 48, 49

These examples illustrate the suppression of flammable vapors of an organic liquid (acetone), and containment of the liquid, using gelable foams of this invention containing polysaccharide. In contrast, comparison examples containing no gelling agent were not effective in suppressing the vapors.

Each fluid foam was generated in a 480 cc glass jar by vigorously shaking by hand 25 times Prepolymer B gelling agent, a foaming solution containing surfactant, polysaccharide, and water. The foams were poured into beakers containing acetone, filling the free volume to give an initial foam thickness of about 2.5 cm in each case. Foam thickness was measured at various time intervals after the foam was poured into the beaker. The ignition test was carried out 45 minutes after the foam was poured.

The sealing/containment property of each foam was also evaluated right away after the ignition test by inversion of the beakers containing the gelled foam ("SEALING TEST") and noting any leakage of the acetone.

The examples and results are summarized in Table VI.

EXAMPLES 50, 51

These examples illustrate the use of gas chromatography to measure the concentration of benzene vapor above foam-covered benzene.

In each example, the lower half of a two-piece, 25 cm diameter, cylindrical, glass chamber, having a total interior volume of about 5100 cc, was placed water to a depth of about 5 cm. A 1 cm layer of benzene was then poured on the water surface. The upper half of the glass chamber, containing a foam entry port and gas inlet and outlet openings, was placed on top of the lower half of the chamber containing the water and benzene. A foam was added to the chamber and the latter purged with nitrogen, as described below. A gas-tight seal between the upper and lower halves of the chamber was achieved by lubrication of the ground glass, cylinder mating edges of the two halves with a silicone grease before assembly.

In each example, a nitrogen gas purge of about 340 cc per minute was established and maintained in the chamber before and after adding the foam. Foam was generated from an aqueous surfactant solution with an electric blender operating for 15 seconds. Immediately after foam generation, the aqueous foam was added to the chamber through the foam port, covering the benzene layer to a depth of about 2.5 cm with foam. The foam port was closed and the exiting nitrogen purge gas analyzed by gas chromatography for the presence of benzene.

The percent suppression of benzene vapor by the foam was calculated at various time intervals by comparing benzene gc peak areas ("counts") with foam present to benzene gc peak areas with no foam added to the benzene layer. The results are shown in Table VII. The comparative Example C50, containing no gelling agent, had the least vapor suppression after all time intervals, having only 6% suppression after 8 hours, while the foams of the invention still gave greater than 90% suppression after 8 hours. Even after 63 hours, Example 50 (the only example checked at this time interval) gave a 94% suppression of benzene vapor. The foam containing a rubber latex reinforcing agent, Example 51, gave the best results.

TABLE VII

|  | EXAMPLES | | |
|---|---|---|---|
|  | C50 | 50 | 51 |
| Foam Composition | | | |
| Gelling agent, 70 wt. % solution of acetone-free Prepolymer B in propylene glycol monomethyl ether acetate (ARCOSOLV PM acetate), g | — | 15 | 15 |
| Foaming agent, LIGHT WATER AFFF/ATC FC-600, g | 15 | 15 | 15 |
| Reinforcing agent, Dow 638A styrene-butadiene rubber latex (50% solids), g | | | 25 |
| Water, g | 235 | 235 | 210 |
| Benzene vapor suppression, % After time period indicated | | | |
| 30 minutes | 82 | 96 | 98 |
| 2 hours | 23 | 92 | 97 |
| 8 hours | 6 | 93 | 94 |
| 63 hours | — | 94 | — |

EXAMPLE 52

This example illustrates the flexibility of gelled foam of this invention. A foam was prepared by mixing 95 g of a 6% aqueous solution of LIGHT WATER AFFF/ATC FC-600 and 5 g of Prepolymer B gelling agent in a 480 cc jar and shaking vigorously 25 times. The freshly made fluid foam was poured onto a release paper to a depth of about 0.6 cm. After about 10 minutes, the gelled aqueous foam was cut into 3 strips each about 1.25 cm wide. The strips were bent or configured in the following positions:
Strip 1. 90 degrees over the edge of lab bench;
Strip 2. 360 degrees around a 0.63 cm diameter steel mandrel;
Strip 3. 360 degrees around a 5 cm diameter steel mandrel.
After 24 hours, each of the strips was brought back to original flat position (0 degrees) with no breaking or cracking of the gelled foam, indicating good flexibility and physical integrity.

EXAMPLE 53

This example illustrates the adhesion of gelled foam of this invention to various materials. The foam was prepared by mixing 95 g of a 6% aqueous solution of LIGHT WATER AFFF/ATC FC-600 aqueous surfactant solution and 5 g of Prepolymer B gelling agent in a 480 cc jar and shaking vigorously 25 times. The freshly made fluid foam was poured into three 65 cc plastic cups and the following articles placed upright in the foam:

| Cup | Article |
|---|---|
| 1. | cold roll steel coupon (1.25 cm × 7.5 cm × 0.16 cm thick) |
| 2. | coupon like above except painted with RUSTOLEUM #7765 glossy paint |
| 3. | glass slide (2.5 cm × 7.5 cm × 0.1 cm thick) |

After various time intervals, i.e., 5 minutes, 30 minutes, and 48 hours, the articles embedded in the gelled foam were lifted by hand. In each case, the cup and gelled foam contents were raised along with the lifted article, indicating good adhesion of the gelled foams to each of the articles.

EXAMPLE 54

This example illustrates the adhesion of the gelled foam of this invention to wood. The foam, with an expansion value of about 3, was prepared by mixing 95 g of a 6% aqueous solution of LIGHT WATER AFFF/ATC FC-600 and 5 g of Prepolymer B gelling agent in a 480 cc jar and shaking vigorously 25 times. The freshly made fluid foam was poured into a 65 cc plastic cup and a wood tongue depressor (1.9 cm×7.5 cm×0.17 cm thick) was placed upright in the foam. After intervals of 30 minutes, 24 hours, and 48 hours, the cup and gelled foam contents were raised by grasping the tongue depressor and lifting it. (After 54 hours it was found that the weight of the foam had decreased from an initial weight of 12.5 g. to 5.4 g, but that the area of contact on the tongue depressor, 12.9 sq. cm, remained the same.) Weight was then added to the cup until the bond to the wood failed at 159.5 g (the total weight suspended by the lifted tongue depressor). Failure appeared to be mainly cohesive, i.e., within the foam, since foam residue was still on the wood.

(A solution prepared like that above but not shaken did gel but did not expand, showing the $CO_2$ byproduct was insufficient to form a foam of any significant expansion.)

EXAMPLE 55

This example illustrates the heat insulating properties of gelled foams of this invention using a simulated fire test.

Corrugated paper carton material having a density of 0.58 kg/m$^2$ (53.6 g/ft$^2$) was cut to give two pieces each measuring 15 cm×20 cm. A gelable fluid foam was prepared by shaking vigorously 25 times a mixture of 95 grams of 3% aqueous solution of LIGHT WATER AFFF FC-203C and 5 grams of Prepolymer C gelling agent (prepared like Prepolymer B but using benzyl butyl phthalate as solvent instead of acetone) in a 480 cc glass jar. The resulting fluid foam was poured onto the horizontal surface of one of the paper carton pieces where it gelled (in about 80 seconds). The gelled foam on the paper surface was about 1.5 cm in thickness. This foam-coated paper carton piece was designated sample "B" and an untreated paper carton piece was designated sample "A".

A propane torch was fixed so the torch nozzle was in a vertical position and centered about 13 cm under a 15 cm diameter, fixed horizontal iron ring. The torch was ignited and adjusted to produce a 10 cm high flame. The untreated Sample A was placed on the ring above the flame. The time for appearance of flame on the top surface of Sample A was 16 seconds. After removing Sample A from the ring, the foam-treated Sample B was then placed on the ring with the foam-coated side down. The time for flame to appear on the top surface of Sample B was 83 seconds, about 5 times longer than for untreated Sample A.

This example illustrates the utility of foams of this invention in protecting Class A combustible materials from fire by providing an insulating gelled foam blanket on the surface of the material exposed to fire. The insulating property of the foam could also be used to prevent heat loss.

EXAMPLE 56

This example illustrates the thermal insulation properties of the foams of this invention in accelerating the curing or setting of cement slurry exposed to cold temperatures.

Two one-gallon polyethylene plastic bottles were cut about 15 cm from the bottom to form two cylindrical containers. These containers were both placed in a corrugated paper box filled with vermiculite as a particulate insulating material, so that all outer surfaces of the containers were insulated with at least 2.5 cm of packing material, the top of the containers being left open. A cement slurry prepared from 75 parts by weight of portland cement (Lehigh Type I) and 25 parts water was added to each plastic container, giving a slurry depth of approximately 5 cm in each container. An alcohol bulb type thermometer was inserted into each cement slurry, reaching to the bottom of the respective containers. After allowing the cement samples to stand under ambient temperature (about 22° C.) in the laboratory for 30 minutes, a foam was made by vigorously mixing in an electric blender for 15 seconds 200 g of a 6 wt. % aqueous solution of LIGHT WATER AFFF/ATC FC-600 concentrate and 12 g of a 70 wt. % solution of acetone-free Prepolymer B gelling agent in propylene glycol monomethyl ether acetate (ARCOSOLV PM acetate). This foam was poured immediately on top of one of the cement slurries (Example 56) to give a foam depth of about 5 cm; the other cement slurry (Example C56) was kept as a control.

The paper box containing the two cement samples was placed outdoors where the temperature was −5° C. Periodically the temperature and degree of cure of each cement sample was observed and recorded. The results, summarized in Table VIII clearly show the more rapid cure or set time of the cement sample (Example 56) protected with a layer of a gelled foam of this invention.

TABLE VIII

| | EXAMPLES | | | |
|---|---|---|---|---|
| | 56 | | C56 | |
| Elapsed time* | Temp., °C. | Cure state | Temp., °C. | Cure state |
| 0 | 28 | fluid | 28 | fluid |
| 45 min. | 25.5 | fluid | 23 | fluid |
| 1 hr. 50 min. | 24 | setting up | 16 | fluid |
| 3 hr. 30 min. | 24 | cured | 9 | setting up |
| 4 hr. 45 min. | 28 | cured | 6 | partially |

TABLE VIII-continued

| | EXAMPLES | | | |
|---|---|---|---|---|
| | 56 | | C56 | |
| Elapsed time* | Temp., °C. | Cure state | Temp., °C. | Cure state |
| | | | | cured |

*After placing the box and samples outside at −5° C. temp.

EXAMPLE 57

This example illustrates the effective use of a gelled foam of this invention in the containment of flammable liquid and suppression of its vapors emitted from a simulated hazardous waste site, namely sand saturated with an organic solvent.

To each of two approximately 275 cc capacity metal cans (A and B) was added 140 cc of dry and saturated with 45 ml of acetone. This quantity of liquid wet all of the sand in each can, but no free liquid acetone was visible on the sand surface.

Foam was generated in 480 cc glass jars by shaking vigorously 25 times the following aqueous compositions:

Foam 1. A comparison foam made from 95 g of 6% aqueous solution of LIGHT WATER AFFF/ATC FC-600;

Foam 2. A foam of the invention made from a mixture of 95 g of 6% aqueous solution of LIGHT WATER AFFF/ATC FC-600 and 5 g of Prepolymer C (see Example 55) gelling agent.

The fluid foams, generated upon shaking the jars, filled each of the jars (thus, the foams had an expansion value of about 5). Twenty grams of foam from each of the jars was immediately poured into the cans containing the acetone-wet sand—Foam 1 into Can A, and Foam 2 into Can B—filling each can to the top. After standing one hour, the top of the foam was still at the top of each can.

The following tests were run after one hour.

Ignition Test.

Can A: an immediate flash and ignition.

Can B: no ignition.

Sealing/Containment Test.

Can A: after the above Ignition Test, Can A was placed on its side, and most of the liquid and some of the sand drained out.

Can B: after the above Ignition Test, Can B was placed on its side and observed for 5 minutes; the gelled foam remained intact and no liquid or sand drained out.

EXAMPLES 58, 59, 60

These examples illustrate the preparation and use of "one-part" concentrates in the preparation of foams of this invention.

In Example 58, a storage-stable, water-soluble, water-reactive organic solution ("Concentrate A") was prepared by blending (1) 34 g of a 26.5 wt.% surfactant solution of sodium dioctyl sulfosuccinate (AEROSOL OT-100) in ethyl acetate, which solution had been dried overnight with anhydrous calcium sulfate (DRIERITE), and (2) 100 g of a 75 wt. % solution of acetone-free Prepolymer B gelling agent in propylene glycol methyl ether acetate (ARCOSOLV PM acetate).

In Example 59, a similar organic solution ("Concentrate B") was prepared by blending (1) 34 g of solution of an ethyl acetate surfactant solution containing 21.9 wt. % AEROSOL OT-100 and 4.56 wt.% $C_6F_{13}SO_2NHC_3H_6N^+(CH_3)_2CH_2CH_2COO^-$, which had been dried overnight with DRIERITE, and with (2) 100 g of the same gelling agent solution used in Concentrate A.

In Example 60, a third organic solution or "one-part" concentrate (Concentrate C) was prepared by blending (1) 30 g of a solution containing 23.5 wt. % sodium n-dodecylbenzenesulfonate (a commercially available, biodegradable surfactant sold as SIPONATE DS-10) in N-methyl pyrrolidone solvent, filtered through #4 Whatman filter paper to remove sediment and dried overnight with Grade 564 Molecular Sieves (DAVIDSON), and (2) 70 g of acetone-free Prepolymer B gelling agent.

Each of the concentrates was diluted with water to form a 7.2 wt.% aqueous solution (Examples 58, 59) or a 6 wt.% aqueous solution (Example 60), and 100 g of each such solution was immediately vigorously shaken by hand in a 480 cc closed glass jar for 2 minutes. Twenty g of each resulting fluid foam (expansion value of about 4) was then immediately poured into a 250 cc polyethylene beaker containing 200 ml isopropyl ether, the floating fluid foam gelling within about 1 minute after being so poured. The beakers and their contents were weighed immediately and 90 minutes thereafter to determine weight losses by the differences in the weights. An Ignition Test was performed in each example immediately after the final weights were measured. These examples and the weight loss and ignition results are summarized in Table VI. In comparative Example C60, a 6 wt. % aqueous solution of LIGHT WATER FC-600 AFFF/ATC foaming agent was similarly shaken and the resulting fluid foam similarly tested.

TABLE IX

| | EXAMPLES | | | |
|---|---|---|---|---|
| | 58 | 59 | 60 | C60 |
| Foam composition (g) | | | | |
| Concentrate A | 7.2 | | | |
| Concentrate B | | 7.2 | | |
| Concentrate C | | | 6 | |
| LIGHT WATER AFFF/ATC FC-600 | | | | 6 |
| Water | 92.8 | 92.8 | 94 | 94 |
| Weight loss, g. | 1.6 | 1.5 | 2.0 | 6.9 |
| Ignition Test results | No | No* | No | Yes |

*A small piece of the foam was held in the flame of a burning propane torch but did not ignite, showing that the foam did not burn.

The data in Table IX show that the three different one-part concentrates were effective in making gelled foams that suppress evaporation of flammable liquid.

EXAMPLE 61

A 16.5 g sample of the gelled foam prepared from Concentrate A of Example 58 was placed in an oven (100° C.) and dried for 40 minutes. The dried sample had shrunk but still had a cellular structure and was intact, and it weighed 6.8 g, the weight loss being about 69%. The dried sample was immersed in tap water at room temperature (ca 22° C.), removed from the water, surface water removed with paper towel, and the sample then weighed, the weight being 16.8 g. This example shows that the gelled foam of the invention can be dried but easily rehydrated.

EXAMPLE 62

This example illustrates the use of an aqueous styrene-butadiene (SBR) latex as a toughener and shrink control agent for the gelled foams of this invention.

Foam was generated in 480 cc glass jars by shaking vigorously 25 times the following aqueous compositions:

Foam 1 This foamable composition comprised (a) 94 g of a 6% aqueus solution of LIGHT WATER AFF-F/ATC FC-600 aqueous surfactant solution, and (b) 6 g of a 70 wt.% solution of acetone-free Prepolymer B gelling agent in propylene glycol monomethyl ether acetate (ARCOSOLV PM acetate).

Foam 2 This foamable composition comprised (a) 84 g of a 6% aqueous solution of LIGHT WATER AFF-F/ATC FC-600 aqueous surfactant solution, (b) 6 g of a 70 wt.% solution of acetone-free Prepolymer B gelling agent in ARCOSOLV PM acetate, and (c) 10 g of aqueous styrene-butadiene rubber latex, Dow 638A, 50% solids.

Each foam was poured on approximately 200 ml of used, 10W-30 automobile engine oil placed in 12.7 cm × 10.2 cm rectangular aluminum pans. After gelation of the foam had occurred, the stabilized Foam 2 (containing the SBR latex) was firmer to the touch than the Foam 1 (without latex).

After aging the foams in the pans in the laboratory for one week, during which the foams partially dehydrated, aged Foam 1 had pulled away from one side of the pan and had shrunk to approximately half its original size. However, aged Foam 2 had much less shrinkage and remained adhered to all sides of the pan and continued to cover the entire surface of the oil, even after standing for 3 months.

In other foams, prepared like Foam 2, up to 40 g of the rubber latex was used, the foams so prepared and aged having even less shrinkage than that of aged Foam 2 and were firmer, that is, tougher.

EXAMPLE 63

This examples illustrates the capability of a gelable, foamable composition of this invention made with an AFFF-type surfactant system (viz., a combination of a fluoroaliphatic surfactant and hydrocarbon surfactant) to form a vapor suppressing film on a flammable liquid.

To 7.2 g of Concentrate B of Example 59 was added 92.8 g of water to form a homogeneous solution. After 45 seconds of stirring the solution, two drops of the solution was placed on the surface of 15 ml of cyclohexane in a 6 cm diameter Petri dish. A film was observed to spread and cover the surface of the cyclohexane in less than 15 seconds. Immediately after the film so formed, a burning match placed near the surface of the cyclohexane did not cause ignition, indicating that a vapor-suppressing film was on the surface of the cyclohexane. It was noted, about 3 minutes after the ignition test, that the film had gelled and could be lifted virtually intact from the cyclohexane surface.

EXAMPLE 64

This example illustrates the effective control and suppression of flammable volatile liquid in a simulated hazardous waste site using a gelled foam of this invention.

Two shallow pits measuring about 30 cm × 40 cm × 8 cm (depth) were dug about 1.2 m apart in wet clay soil at the edge of a road (slope about 10° away from road) in a fire-fighting test area. Four liters of a flammable liquid mixture of equal volumes of acetone and 80 octane aviation gas was poured on the clay slope immediately above each pit, most of the mixture flowing into the pit.

Weather conditions during the test were a temperature of 4° C., a wind velocity about 10 mph with occasional gusts of higher velocity, and intermittent rain (light drizzle to heavy rain).

The apparatus used in this example to make and apply foam to the pits was that proportioning, foam generating, and foam application apparatus described hereinbefore. The air pressure of the vessel containing the tank of gelling agent and tank of solvent was 0.34 MPa, and the air pressure of the vessel containing the tank of surfactant solution was 0.69 MPa. The gear pump and the appropriate valves were adjusted to deliver via a 7.6 LPM (liters per minute) air-aspirator nozzle either Comparison Foam A, a 6% aqueous solution of LIGHT WATER AFFF/ATC FC-600 foaming agent, or Invention Foam B, a blend of said 6% aqueous solution of foaming agent and Prepolymer C (see Example 55), to yield a gelable foam composition containing 4.91% gelling agent solids and about 95 wt. % water. The expansion value of both resulting foams was about 6.

The following describes the steps, events, and results of this example.

| Elapsed time | Step, event and/or results |
|---|---|
| 0 | The flammable liquid mixture was poured on the clay slope of the pits as described above. |
| 1 min. | Foam A (without gelling agent) was applied to one of the pits (Pit A) for 30 seconds, covering the flammable liquid surface in the pit, and to the surrounding soil, covering a surface area about 1 meter in diameter. |
| 2 min. | Foam B (containing the gelling agent) was applied to the second pit (Pit B) for 30 seconds, covering the flammable liquid surface in the pit and the surrounding soil as above. |
| 4 min. | Applied Foam B gelled. (Applied Foam A never did gel.) |
| 25 min. | Light rain containing. Foam decreased around Pit A. Gelled Foam B around and in Pit B was intact. |
| 35 min. | Harder rain (estimated rate: 0.08 to 0.16 LPM/m²). |
| 50 min. | No Foam A left around Pit A. Foam B around and in Pit B was visually and physically intact; some muddy water visible on surface of gelled foam in Pit B due to rain runoff from up slope. |
| 62 min. | 20% of flammable liquid surface in Pit A no longer covered by Foam A. Foam B visually and physically intact. |
| 90 min. | Foam A in Pit A completely disappeared. Foam B visually and physically intact. |
| 160 min. | Raining hard. |
| 190 min. | Foam B in and around Pit B still intact and no flammable liquid surface visible. |
| 46 days | Pit A empty of flammable liquid and dry. Pit B empty of flammable liquid but damp. Foam B flexible, tough, and suspended above about 85% of bottom of Pit B and firmly adhered to about 70% of perimeter of pit. |

EXAMPLE 65

At a fire-testing location, a demonstration of a foam of this invention was conducted as follows, using the same apparatus as Example 64.

An 8 ft (2.4 m) diameter, 50 ft² (4.6 m²) concrete-lined pit, surrounded by 4 in. (10 cm) high concrete dike, was filled with water to about 3 in. (7.5 cm) from the top of the dike. A ½ in (0.125 cm) layer of aviation gasoline was placed on the water in the pit. A 5 gallon (19 L) weighted pail was placed in the pit about 1 foot (30 cm) from the edge of the dike, a 2.5 in (6.4 cm) diameter pipe was vertically placed about 1 ft. (30 cm) from the opposite edge of the dike. A gelable foam, made from an aqueous solution containing 6 wt. % aqueous solution of LIGHT WATER AFFF/ATC FC-600 foaming agent and 5 wt. % Prepolymer B, was applied to the pit for two minutes at a solution flow rate of 2 GPM (7.6 LPM). This provided a solution application density of 0.08 gal./ft² (3.25 L/m²).

After gelation of the foam (about 90 seconds), the 5 gallon pail and the 2.5 in. pipe were removed to provide open areas in the gelled foam of about 12 in. (30 cm) and 2.5 in. (6.4 cm) in diameter, respectively. The exposed gasoline in the smaller open area was ignited and allowed to burn. During a 5 min period of burning, it was noted that there was no enlargement of the burning area and an apparent aqueous film released from the gelled foam, by reason of the heat of the fire, tended to extinguish the fire. The exposed gasoline in the larger open area was also ignited and allowed to burn freely for about 8 to 10 minutes, and the area enlarged only slightly during that time.

Gelled foam was cut loose from the edge of the pit and was pushed away from the edge. When released, the cut foam sprang back to its original position, showing its resiliency. When a burning torch was passed over the cut edge, only self-extinguishing flicker flames resulted.

After about 10 minutes of the burning of the gasoline in the 12 in diameter open area, a water spray, surrounding the pit, was turned on to simulate rain. The water spray did not degrade the gelled foam blanket or enlarge the fire area.

EXAMPLE 66

At a fire-testing location, a demonstration of a foam of this invention was conducted as follows, using the same apparatus as Example 64.

Six concrete blocks were placed on a sheet of plywood to form a rectangular pit 29 in. × 15½ in. × 7⅞ in. (74 cm × 39 cm × 20 cm) deep. The pit was lined with polyethylene film amd filled with a mixture of dirt, crushed rock, and wood scraps to simulate waste site fill. Approximately 2½ gallons (9.5 L) of a mixture of equal volumes of aviation gasoline and methyl ethyl ketone was poured into the pit, essentially saturating the fill with an odoriferous, flammable liquid. The same gelable fluid foam was applied to this pit as used in Example 65, using the same apparatus. The pit became sealed with a layer of gelled foam approximately ¾ in (2 cm) thick. After sealing, the odor of methyl ethyl ketone was virtually undetectable. There was no ignition when a burning torch was passed over the sealed area. The sealed pit was observed several hours later and its condition had not changed.

Various modifications and alterations of this invention will be apparent to those skilled in the art without departing from the scope and spirit of this invention, and it should be understood that the invention is not to be limited to the illustrative embodiments set forth herein.

What is claimed is:

1. An aqueous, fluid air foam the liquid phase of which comprises surfactant, poly(oxylkylene) polyisocyanate polymer the oxyalkylene portion of which contains sufficient oxyethylene units to render the polymer hydrophilic and water-soluble, and water as the major component of said foam by weight.

2. An air foam according to claim 1 wherein said polymer is represented by the formula:

$$Y_1[(RO)_o\text{-}Y_2(NCO)_p]_z$$

where $Y_1$ is an active hydrogen atom-free residue of an organic compound having a plurality of active hydrogen atoms, $(RO)_o$ is a hydrophilic poly(oxyalkylene) chain having such oxyethylene units to render said polymer hydrophilic and water-soluble, o is the number of oxyalkylene units in said chain, $Y_2$ is an organic linkage, p is 1 to 5, and z is the number of said active hydrogen atoms in said compound.

3. An air foam according to claim 1 wherein said polymer is represented by the formula $$Y_1[(CH_2CH_2O)_o\text{—}C(O)NH\text{—}R'(NCO)_p]_z$$

where $Y_1$ is an active hydrogen atom-free residue of an organic compound having a plurality of active hydrogen atoms, R' is an organic residue of polyisocyanate, o is the number of oxyethylene units shown in the formula, which number is sufficient to render said polymer hydrophilic and water-soluble, p is 1 to 3, and z is 2 or 3.

4. An air foam according to claim 1 wherein said polymer is represented by the formula $$Y_1[(CH_2CH_2O)_a(CH_2\overset{\underset{\displaystyle CH_3}{|}}{CH}O)_b(CH_2CH_2O)_c\text{—}C(O)NH\text{—}R'\text{—}NCO]_z$$

wherein $Y_1$ is an active hydrogen atom-free residue of an organic compound having a plurality of active hydrogen atoms, R' is an organic residue of a polyisocyanate, z is 2 or 3, and a, b, and c are integers such that the ratio (a+c)/b is greater than 1 and the polymer is thus hydrophilic and water-soluble.

5. An air foam according to claim 1 wherein said polymer is represented by the formula $$Y_1[[(CH_2CH_2O)_x(CH_2\overset{\underset{\displaystyle CH_3}{|}}{CH}O)_y]\text{—}C(O)NH\text{—}R'\text{—}NCO]_z$$

where $Y_1$ is an active hydrogen atom-free residue of an organic compound having a plurality of active hydrogen atoms, R' is an organic residue of a polyisocyanate, z is 2 or 3, and x and y are integers such that the ratio x/y is greater than 1 and the polymer is thus water-soluble and hydrophilic, the $CH_2CH_2O$ and $$\overset{\underset{\displaystyle CH_3}{|}}{OCHCH_2}$$

units being randomly distributed within the brackets enclosing said units.

6. An air foam according to claim 3, 4, or 5, wherein said organic residue is an aromatic nucleus derived from an aromatic polyisocyanate.

7. An air foam according to claim 1 wherein said surfactant is selected from nonionic, cationic, anionic, and amphoteric surfactants, and compatible mixtures thereof.

8. An air foam according to claim 1 wherein said surfactant is fluoroaliphatic surfactant or fluorine-free surfactant.

9. An air foam according to claim 1 wherein said surfactant is a combination of fluoroaliphatic surfactant and fluorine-free surfactant.

10. An air foam according to claim 1 having a density less than 1 g/cc.

11. An air foam according to claim 8 wherein said fluoroaliphatic surfactant is represented by the formula $$(R_f)_n(Q)_mZ$$

wherein $R_f$ is a fluorinated, saturated, monovalent organic radical having a terminal perfluoromethyl group, containing from 3 to 20 carbon atoms, in which the carbon atoms of the chain are substituted only by fluorine, chlorine or hydrogen atoms with no more than one hydrogen or chlorine atom for every two carbon atoms, and in which a divalent oxygen or trivalent nitrogen atom, bonded only to carbon atoms, can be present in a skeletal chain, n is 1 or 2, Q is a multivalent linking group, m is an integer from 0 to 2, and Z is a water-solubilizing polar group, and said fluorine-free surfactant is water-soluble to at least about 0.02 percent by weight in water at 20° C. and which substantially completely emulsifies at least one phase of a mixture of equal volumes of cyclohexane and water at a concentration of about 0.1 to about 10 percent by weight of the water.

12. An air foam according to claim 1 wherein said surfactant foaming agent comprises sodium decyl sulfate and said polymer is represented by the formula $$OCNC_6H_3(CH_3)NHCO(OCH_2CH_2\text{-})_nOCONHC_6H_3(CH_3)NCO$$

wherein n is the number of oxyethylene units shown in the formula and is sufficiently high to render the polymer hydrophilic and water-soluble.

13. An air foam according to claim 1 wherein said surfactant foaming agent comprises sodium decyl sulfate and said polymer is represented by the formula $$OCNC_6H_3(CH_3)NHCO[(OCH_2CH_2)_x(O\overset{\underset{\displaystyle CH_3}{|}}{CH}CH_2)_y]OCONHC_6H_3(CH_3)NCO$$

where x and y are integers such that the ratio x/y is greater than 1 and thus the polymer is water-soluble and hydrophilic, the $OCH_2CH_2$ and $$\overset{\underset{\displaystyle CH_3}{|}}{OCHCH_2}$$

units being randomly distributed within the brackets enclosing said units.

14. An air foam according to claim 1 wherein said liquid phase further comprises a low molecular weight polysaccharide.

15. An air foam according to claim 1 further comprising a rubber or polymeric latex.

16. An air foam according to claim 1 wherein said water is fresh water or sea water and is the only inorganic material in said air foam.

17. An anhydrous solution, which upon mixing with water and air produces a fluid air foam, said solution comprising surfactant foaming agent and poly(oxyalkylene)polyisocyanate polymer in an organic, water-soluble or water-dispersible solvent which is non-reactive with water and the polymer, said foaming agent being capable of foaming said water upon aeration thereof, and the poly(oxyalkylene) portion of said polymer containing sufficient oxyethylene units to render said polymer hydrophilic and water-soluble.

18. A gelled two-phase, aqueous air foam comprising a discontinuous air phase and a continuous, aqueous, polymer hydrogel phase comprising, as the major component of said foam by weight, water in which surfactant is dissolved and poly(oxyalkylene)polyurea polymer is dispersed, the oxyalkylene portion of which polymer contains sufficient oxyethylene units to render the polymer hydrophilic.

19. A gelled air foam according to claim 18 wherein said surfactant is fluoroaliphatic surfactant, fluorine-free surfactant, or a combination of said fluoroaliphatic and fluorine-free surfactants.

20. A gelled air foam according to claim 18 wherein said polymer is a poly(urethane-urea) polymer which comprises the reaction product of poly(oxyalkylene)-polyisocyanate polymer and water, the oxyalkylene portion of said polyisocyanate polymer containing sufficient oxyethylene units to render said polyisocyanate polymer hydrophilic and water-soluble.

21. A gelled air foam according to claim 18 wherein said polymer comprises the reaction product of water and a prepolymer represented by the formula:

$$Y_1[(RO)_o-Y_2(NCO)_p]_z$$

where $Y_1$ is an active hydrogen atom-free residue of an organic compound having a plurality of active hydrogen atoms, $(RO)_o$ is a hydrophilic poly(oxyalkylene) chain having such oxyethylene units to render said prepolymer hydrophilic and water-soluble, o is the number of oxyalkylene units in said chain, $Y_2$ is an organic linkage, p is 1 to 5, and z is the number of said active hydrogen atoms in said compound.

22. A gelled air foam according to claim 18 wherein said polymer comprises the reaction product of water and a prepolymer represented by the formula $$Y_1[(CH_2CH_2O)_o-C(O)NH-R'(NCO)_p]_z$$

where $Y_1$ is an active hydrogen atom-free residue of an organic compound having a plurality of active hydrogen atoms, R' is an organic residue of a polyisocyanate, o is the number of oxyethylene units shown in the formula, which number is sufficient to render said prepolymer hydrophilic and water-soluble, p is 1 to 3, and z is 2 or 3.

23. A gelled air foam according to claim 18 wherein said polymer comprises the reaction product of water and a prepolymer represented by the formula $$Y_1[(CH_2CH_2O)_a(CH_2CHO)_b(CH_2CH_2O)_c-C(O)NH-R'-NCO]_z$$
$$| \atop CH_3$$

where $Y_1$ is an active hydrogen atom-free residue of an organic compound having a plurality of active hydrogen atoms, R' is an organic residue of a polyisocyanate, z is 2 or 3 and a, b, and c are integers such that the ratio (a+c)/b is greater than 1 and the prepolymer is thus hydrophilic and water-soluble.

24. A gelled air foam according to claim 18 wherein said polymer comprises the reaction product of water and a prepolymer represented by the formula $$Y_1[[(CH_2CH_2O)_x(CH_2CHO)_y]-C(O)NH-R'-NCO]_z$$
$$| \atop CH_3$$

where $Y_1$ is an active hydrogen atom-free residue of an organic compound having a plurality of active hydrogen atoms, R' is an organic residue of a polyisocyanate, z is 2 or 3, and x and y are integers such that the ratio x/y is greater than 1 and the polymer is thus water-soluble and hydrophilic, the $CH_2CH_2O$ and $$CH_2CHO$$
$$| \atop CH_3$$

units being randomly distributed within the brackets enclosing said units.

25. A gelled air foam according to claim 24 wherein said polyisocyanate is tolylene diisocyanate.

26. A gelled air foam according to claim 24 wherein said polyisocyanate is 1,3,3-trimethyl-5-isocyanatocyclohexyl-1-methylisocyanate.

27. A gelled air foam according to claim 22, 23 or 24, where said organic residue is an aromatic nucleus derived from an aromatic polyisocyanate.

28. A gelled air foam according to claim 18 wherein said polymer comprises the reaction product of water and a prepolymer represented by the formula $$OCNC_6N_3(CH_3)NHCO[(OCH_2CH_2)_x(OCHCH_2)_y]OCONHC_6H_3(CH_3)NCO$$
$$| \atop CH_3$$

where x and y are integers such that the ratio x/y is greater than 1 and thus the polymer is water-soluble and hydrophilic, the $OCH_2CH_2$ and $$OCHCH_2$$
$$| \atop CH_3$$

units being randomly distributed within the brackets enclosing said units.

29. A gelled air foam according to claim 18 having a density less than 1 g/cc.

30. A gelled air foam according to claim 18 further comprising a rubber or polymeric latex.

31. A gelled air foam according to claim 18 wherein said polymer comprising the reaction product of a poly(oxyalkylene)polyisocyanate polymer and water, the oxyalkylene portion of said polyisocyanate polymer containing sufficient oxyethylene to render said polymer hydrophilic and water-soluble.

32. A gelled air foam according to claim 18 wherein said poly(oxyalkylene)polyurea polymer is a poly(urethane-urea).

33. A gelled air foam according to claim 18 wherein said water comprises from 53 to 98 weight percent of said foam.

34. A gelled air foam according to claim 18 wherein said water comprises from 75 to 97 weight percent of said foam.

35. A gelled air foam according to claim 18 wherein said water is fresh water or sea water and is the only inorganic material in said gelled air foam.

36. A viscous two-phase, aqueous air foam comprising a discontinuous air phase and a continuous, viscous liquid phase comprising water, as the major component of said foam by weight, surfactant dissolved in said water, and polyurea polymer comprising a plurality of poly(oxyalkylene) chains containing sufficient oxyethylene units to render said polymer hydrophilic.

37. A viscous foam according to claim 36 wherein said polymer comprises the reaction product of water and a prepolymer represented by the formula:

$$Y_1[(RO)_o-Y_2(NCO)_p]_z$$

where $Y_1$ is an active hydrogen atom-free residue of an organic compound having a plurality of active hydrogen atoms, $(RO)_o$ is a hydrophilic poly(oxyalkylene) chain having such oxyethylene units to render said prepolymer hydrophilic and water-soluble, o is the number of oxyalkylene units in said chain, $Y_2$ is an organic linkage, p is 1 to 5, and z is the number of said active hydrogen atoms in said compound.

38. A viscous air foam according to claim 36 wherein said surfactant is fluoroaliphatic surfactant, fluorine-free surfactant, or a combination of said fluoroaliphatic and fluorine-free surfactants.

39. A viscous air foam according to claim 36 wherein said polymer is a polyurea polymer comprising the reaction product of poly(oxyalkylene)polyisocyanate polymer and water, the oxyalkylene portion of said polyisocyanate polymer containing sufficient oxyethylene units to render said polyisocyanate polymer hydrophilic and water-soluble.

40. A viscous air foam according to claim 36 wherein said poly(oxyalkylene)polyurea polymer is a poly(urethane-urea).

41. A viscous air foam according to claim 36 wherein said foam is closed cell.

42. A viscous air foam according to claim 36 wherein said water comprises from 53 to 98 weight percent of said foam.

43. A viscous air foam according to claim 36 wherein said water comprises from 75 to 97 weight percent of said foam.

44. A viscous foam according to claim 36 wherein said water is fresh water or sea water and is the only inorganic material in said viscous foam.

45. A method of treating a substrate which comprises applying to exposed surface thereof the fluid air foam of claim 1, and allowing the water and polyisocyanate components of said foam to react and form a gelled foam or a viscous foam on said surface.

46. The method of claim 45 wherein said polymer is represented by the formula:

$$Y_1[(RO)_o-Y_2(NCO)_p]_z$$

where $Y_1$ is an active hydrogen atom-free residue of an organic compound having a plurality of active hydrogen atoms, $(RO)_o$ is a hydrophilic poly(oxyalkylene) chain having such oxyethylene units to render said polymer hydrophilic and water-soluble, o is the number of oxyalkylene units in said chain, $Y_2$ is an organic linkage, p is 1 to 5, and z is the number of said active hydrogen atoms in said compound.

47. The method of claim 45 wherein said substrate is that of a body of hazardous waste.

48. The method of claim 45 wherein said substrate is a body of flammable liquid.

49. The method of claim 45 wherein said substrate is a body of combustible material.

50. The method of claim 45 wherein said substrate is a body of cementitious material.

* * * * *

UNITED STATES PATENT AND TRADEMARK OFFICE
CERTIFICATE OF CORRECTION

PATENT NO. : 4,795,590
DATED : January 3, 1989
INVENTOR(S) : Dale W. Kent and Thomas W. Berger It is certified that error appears in the above-identified patent and that said Letters Patent is hereby corrected as shown below:

Column 12, line 1 "$H_6N^{30}$" should be -- $H_6N^+$ --.

Column 32, line 62 the word "poly(oxylkylene)" should be -- poly(oxyalkylene) --.

Column 33, line 7 the word "such" should be --sufficient--.

Column 35, line 39 the word "such" should be -- sufficient --.

Column 36, line 35 "$N_3$" in the formula should be --$H_3$--

Column 36, line 55 the word "comprising" should be -- comprises --.

Column 37, line 20 the word "such" should be -- sufficient --.

Column 38, line 25 the word "such" should be -- sufficient --.

Signed and Sealed this

Nineteenth Day of July, 1994

Attest:

BRUCE LEHMAN

Attesting Officer  Commissioner of Patents and Trademarks